（12) United States Patent
Wiener et al.

(10) Patent No.: US 10,580,032 B2
(45) Date of Patent: Mar. 3, 2020

(54) EVALUATING PAGE CONTENT TO DETERMINE USER INTEREST

(71) Applicant: ORACLE INTERNATIONAL CORPORATION, Redwood Shores, CA (US)

(72) Inventors: David Abraham Wiener, Cupertino, CA (US); David Scott Gardner, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1139 days.

(21) Appl. No.: 14/861,222

(22) Filed: Sep. 22, 2015

(65) Prior Publication Data
US 2016/0092914 A1 Mar. 31, 2016

Related U.S. Application Data

(60) Provisional application No. 62/055,493, filed on Sep. 25, 2014.

(51) Int. Cl.
G06Q 30/02 (2012.01)
(52) U.S. Cl.
CPC ..... G06Q 30/0246 (2013.01); G06Q 30/0277 (2013.01)
(58) Field of Classification Search
None
See application file for complete search history.

(56) References Cited

U.S. PATENT DOCUMENTS

| 8,706,871 | B2 | 4/2014 | Wiener et al. |
| 2004/0107267 | A1 | 6/2004 | Donker et al. |
| 2007/0283036 | A1 | 12/2007 | Dey et al. |
| 2010/0088411 | A1 | 4/2010 | Litofsky et al. |

(Continued)

FOREIGN PATENT DOCUMENTS

WO    WO 2014/015025    1/2014

OTHER PUBLICATIONS

Michael Holub and Maria Bielikova. Estimation of User Interest in Visited Web Page. ACM, Apr. 2010, 1111-1112. (Year: 2010).*

Primary Examiner — William A Brandenburg
Assistant Examiner — Christopher C Busch
(74) Attorney, Agent, or Firm — Kilpatrick Townsend & Stockton LLP

(57) ABSTRACT

The disclosure is directed to approaches for combining server-side decisions based on user attributes and/or demographics with client-side decisions based on expressed or implied user interests determined based on the contents of a web page being visited by the user. A server is responsive to an occurrence of an operation of a client device at the web page. Processing steps determine particular executable web page content to send to the client device (e.g., where the particular executable web page content is determined in response to a particular client-side operation). The web page is rendered with the aforementioned executable web page content. Server-side processing receives messages that are emitted conditionally, based on the occurrence of a user event. An event log message comprises a portion of the web page, such as a string, indicating or implying user interest. A targeted advertisement is presented to the user based on the user interest.

20 Claims, 19 Drawing Sheets

(56) References Cited

U.S. PATENT DOCUMENTS

| | | |
|---|---|---|
| 2011/0302235 A1 | 12/2011 | Monk et al. |
| 2012/0144288 A1 | 6/2012 | Caruso et al. |
| 2013/0097013 A1* | 4/2013 | Schaub ............. G06Q 30/0249 |
| | | 705/14.45 |
| 2013/0132833 A1* | 5/2013 | White .................... G06F 3/048 |
| | | 715/704 |
| 2014/0278939 A1* | 9/2014 | Hotta ................ G06Q 30/0246 |
| | | 705/14.45 |
| 2015/0310484 A1* | 10/2015 | Haile ................ G06Q 30/0246 |
| | | 705/14.45 |

* cited by examiner

```
http://tags.bluekai.com/site/1?ret=html& phint=type=flight & dest=SFO & departure=JFK ...

Response to website has
<html><head></head><body>
...
<script>
<!-- if phints match conditions then
        find element 'pl_13456', strip comments and place comments into a new div
        create img element with src='//tags.bluekai.com/site/12345?pl+13456&pb=1'
-->
</script>
<script id='pl_13456'>
<!--<img src="http://view.atdmt.com/action/BestBuy_BK_GPS" width=1 height=1 border=0 alt="">
<img src="http://tag.yahoo.com/5302?Appnexus" width=1 height=1 border=0 alt="">-->
</script>
</body></html>
```

| Taxonomy ID | Taxonomy Component 1 | Taxonomy Component 2 | Taxonomy Component 3 | Taxonomy Component 4 | Taxonomy Component N |
|---|---|---|---|---|---|
| 21496 | In-Market | Local Goods and Services | Education | | |
| 21497 | In-Market | Local Goods and Services | Arts & Entertainment | | |
| 21498 | In-Market | Local Goods and Services | Apartment Rentals | | |
| 21014 | In-Market | Local Goods and Services | Local Goods | | |
| 21968 | In-Market | Local Goods and Services | Local Services | | |
| 21961 | In-Market | Local Goods and Services | Facilities | | |
| 21964 | In-Market | Local Goods and Services | Education | Schools | |
| 21970 | In-Market | Local Goods and Services | Education | Training | |
| 21971 | In-Market | Local Goods and Services | Education | Schools | Vocational |
| 21530 | In-Market | Local Goods and Services | Education | Schools | Sports Instruction |
| 21972 | In-Market | Local Goods and Services | Education | Training | |

4E50

| Taxonomy ID | Taxonomy Path |
|---|---|
| 21814 | In-Market --> Local Goods and Services --> Apartment Rentals |
| 21815 | In-Market --> Local Goods and Services --> Apartment Rentals --> By State |
| 21816 | In-Market --> Local Goods and Services --> Apartment Rentals --> By Price |
| 21862 | In-Market --> Local Goods and Services --> Apartment Rentals --> By State --> Alabama |
| 21863 | In-Market --> Local Goods and Services --> Apartment Rentals --> By State --> Alaska |
| 21864 | In-Market --> Local Goods and Services --> Apartment Rentals --> By State --> Arizona |
| 21865 | In-Market --> Local Goods and Services --> Apartment Rentals --> By State --> Arkansas |
| 21866 | In-Market --> Local Goods and Services --> Apartment Rentals --> By State --> California |
| 21867 | In-Market --> Local Goods and Services --> Apartment Rentals --> By State --> Colorado |
| 21868 | In-Market --> Local Goods and Services --> Apartment Rentals --> By State --> Connecticut |

FIG. 4E

EVALUATING PAGE CONTENT TO DETERMINE USER INTEREST

RELATED APPLICATIONS

The present application claims the benefit of priority to co-pending U.S. Patent Application Ser. No. 62/055,493, entitled "EVALUATING PAGE CONTENT TO DETERMINE SPECIFIC USER DEMOGRAPHICS" filed Sep. 25, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of web page scripting techniques, and more particularly to techniques for generating scripts to evaluate page content to determine user interests.

BACKGROUND

Internet advertising is ubiquitous. Web advertising can be targeted to a person viewing information on various client devices (e.g., while "browsing" online using a desktop computer or mobile device). When a user visits a web page, the client device presenting the web page (e.g., using a browser application) and the web server and other data servers providing the web page content interact to identify the user. In some situations, a client device and other servers interact further to identify various interests, characteristics, or attributes of the user. For example, a user might visit a web page of a travel site, and an online advertiser might want to know not only information regarding the occurrence of such a visit, but also might also want to know certain characteristics of the user behavior or interest as expressed during the visit.

Based on the demographics of the user—such as if the user is within some age range (e.g., age 24-36) and/or gender, and/or has an annual income within some particular annual income range (e.g., $50 k-$75 k, $75 k-$100 k, etc.)—the advertiser might present a particular advertisement or message on the web page. In some cases the advertiser might want to select a particular advertisement based on a particular demographic; for example, if the user is identified as having an annual income greater than $100 k, then the advertiser might present an advertisement for luxury vacation packages. If the user is identified as having an annual income less than $100 k then the advertiser might want to present an advertisement for budget vacation packages.

In some cases, the demographics pertaining to specific users are stored at a server, or at multiple servers, depending on the scale of the data provider. Such a demographic storage technique is effective to screen a user vis-à-vis attributes that are relatively unchanging and/or are readily captured in standard attribute taxonomies. However, in some cases, an Internet advertiser might want to know the specific site (e.g., the URL of a particular travel site) that the user is currently visiting, and further, the advertiser might want to consider information derived from the particular web page the user is visiting (e.g., "Caribbean travel destinations", "July 23 departure date", etc.) in order to target that user with an even more relevant advertisement or message. Legacy techniques can look up certain demographics (e.g., from a database or at a server) pertaining to a particular user, however legacy techniques fail to capture specific user interaction with web page components at the web page that the user is currently browsing. Techniques are needed to address the problem of presenting targeted advertisements to a targeted online user based on instantaneous user interests (e.g., based on capture of real-time user behaviors) that are determined from user interaction with web page components.

None of the aforementioned legacy approaches achieve the capabilities of the herein-disclosed techniques for evaluating page content to determine user interest. Therefore, there is a need for improvements.

BRIEF DESCRIPTION OF THE DRAWINGS

The drawings described below are for illustration purposes only. The drawings are not intended to limit the scope of the present disclosure.

FIG. 4B depicts samples of request and response code responsive to client-side targeting operations as used in systems for evaluating page content to determine user interest, according to one embodiment.

FIG. 4E depicts representations of taxonomies, according to some embodiments.

DETAILED DESCRIPTION

Figure 1:
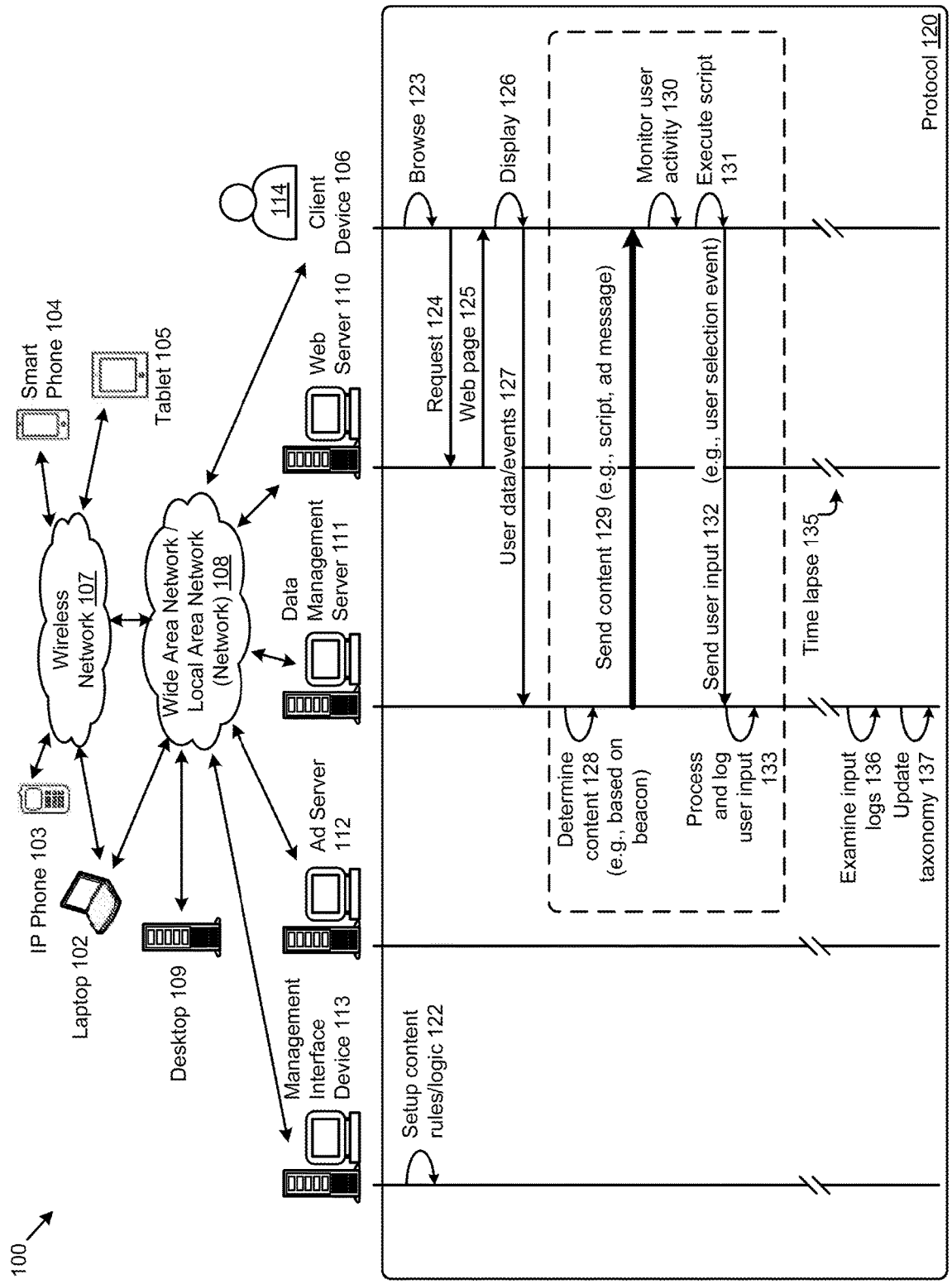
FIG. 1 exemplifies an environment supporting methods, systems, and computer program products for evaluating page content to determine user interest.

Some embodiments of the present disclosure address the problem of presenting targeted advertisements to a targeted online user based on instantaneous user interests and some embodiments are directed to approaches for combining server-side decisions based on online visitor demographics with client-side decisions based on characteristics of the web page being visited. More particularly, disclosed herein and in the accompanying figures are exemplary environments, systems, methods, and computer program products for evaluating page content to determine user interest.
Overview The present disclosure describes improvements to server-based targeting. In server-based targeting, user demographics are stored at a server, and accessed (e.g., from a client device) to determine user attributes. Such attributes are determined by accessing various audience segmentations and taxonomies established by advertisers and data providers. The attributes are then compared at a server to business logic and rules defined by advertisers to determine subsequent actions, (e.g., presenting targeted advertisements to a targeted user based on the user's demographics). Improvements described herein can also consider specific instantaneous user interests as determined from information on the then-current web page. Specifically, the present invention enables the business logic to be defined so as to be triggered based on instantaneous key-value pairs (e.g., price-$14.99, destination-SFO, etc.) that may be present on the current web page being viewed by the user. The relationship between the keys and values can include Boolean operators (e.g. greater than, less than, greater than or equal, etc.). The capability for including web page key-value pairs and enhanced operators in the business logic and targeted advertising is enabled, in part, through scripts that are sent for execution on the client device. The business logic can also define conditional content (e.g., tags, advertisements, beacons, etc.) that is sent with the scripts to be included in the web page based on the script execution results. The aforementioned techniques and other techniques disclosed herein, therefore enable evaluation of page content to determine user interest, allowing targeted advertisements to be presented to a targeted user based on instantaneous user interests.

Privacy laws or privacy expectations may prevent advertisers from getting information about each user beyond each advertiser's direct interactions with the user. Techniques are needed to reach larger target audiences in a messaging campaign, regardless of the particular device that an audience member might be using, regardless of the source of information (possibly from different potential advertisers) that would make a particular audience member a good target for the marketing message. Techniques, such as are disclosed herein are needed to reach particular audience members, yet without violating the privacy laws or privacy expectations of any individuals.
Definitions Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.
Descriptions of Exemplary Embodiments FIG. 1 exemplifies an environment 100 supporting methods, systems, and computer program products for evaluating page content to determine user interest. As an option, one or more instances of environment 100 or any aspect thereof may be implemented in the context of the architecture and functionality of the embodiments described herein. Also, the environment 100 or any aspect thereof may be implemented in any desired environment.

As shown in FIG. 1, environment 100 comprises various computing systems (e.g., servers and devices) interconnected by a wireless network 107 and a network 108. The wireless network 107 and the network 108 can comprise any combination of a wide area network (e.g. WAN), local area network (e.g. LAN), cellular network, wireless LAN (e.g. WLAN), or any such means for enabling communication of computing systems. The wireless network 107 and network 108 can also collectively be referred to as the Internet. More specifically, environment 100 comprises at least one instance of a web server 110, at least one instance of a data management server 111, and at least one instance of an ad server 112. The servers shown in environment 100 can represent any single computing system with dedicated hardware and software, multiple computing systems clustered together (e.g., a server farm), a portion of shared resources on one or more computing systems (e.g., virtual server), or any combination thereof. Environment 100 further comprises at least one instance of a client device 106 and at least one instance of a management interface device 113. The client device 106 and the management interface device 113 can represent one of a variety of other computing devices (e.g., a desktop computer 109, a laptop computer 102, an IP phone 103, a smart phone 104, a tablet 105, etc.) having hardware and software (e.g. web browser application) capable of processing and displaying information (e.g., web page, graphical user interface, etc.), and communicating information (e.g., web page request, user activity, campaign settings, etc.) over the wireless network 107 and the network 108. A representative instance of a user 114 operating the client device 106 is also shown in environment 100.

In one embodiment, client device 106, web server 110, data management server 111, ad server 112, and management interface device 113 exhibit a set of high-level interactions (e.g., operations, messages, etc.) in a protocol 120. Specifically, management interface device 113 can enable the setup of content and business rules and logic for use in targeted online advertising (see operation 122). Further, the user 114 on the client device 106 can initiate a browsing session (see operation 123) such that a request 124 is sent to the web server 110. The web server 110 can respond by transmitting a web page 125 to the client device 106. The web page 125 can be a document deploying hypertext markup language (HTML) formatting, or other such known or standard formatting, and including content to be displayed by the client device 106 (see operation 126). Such web page content defines the various elements (e.g., text boxes, buttons, hyperlinks, images, animations, forms, etc.) that will appear on client device 106 when web page 125 is rendered by a web browser on client device 106. A combination of such elements included in web page 125 can comprise an advertisement or call to action for the user 114. For example, such activity of the user 114 on the client device 106 can initiate the sending of user data and event information (see message 127) to the data management server 111. The data management server 111 will analyze the information to determine the content 129 to send to the client device 106 in response, or will send instructions to the ad server or web server in order for the ad server or web server to send content to the client device (see operation 128).

In one or more embodiments, the content 129 can include software instructions (e.g., "scripts", e.g., JavaScript, JScript, ECMAScript, VBScript, Java, etc.) to perform various tasks. As an example, scripts may be executed on either web server 110 (e.g., "server-side") or client device 106 (e.g., "client-side") to dynamically modify the contents of the web page (e.g. to display or not display certain content based on certain criteria) as displayed on the client device 106. Further, the scripts may also monitor the browsing activity of user 114 at the client device 106 (see operation 130) and conditionally execute (see operation 131) in response to a certain set of user input 132 (e.g. entered text, dropdown selections, radio button selections, checkbox selections, etc.). As an example, the user input 132 may be processed to dynamically fill out other parts of a form on the web page 125 based on the existing inputs, or validate that the inputs conform to certain formats or rules. The user input 132 may also comprise other types of input that can be used by the scripts such as DOM events (e.g. document object model DOM events) or any other sorts of events that are initiated by the user 114 (e.g. mouse events, keyboard events, HTML form/frame events, progress events, etc.). Common DOM events include button clicks and double-clicks, content mouseovers, content drags, page loads, page scrolls, page resize, activity progress, etc. Scripts and other executable code can also be included in web page 125 to enable communication of the user input 132 (e.g., information and activity) to the data management server 111 for logging (see operation 133). The user input 132 may comprise information that can be used to impute user interest. For example, the web page may present two or more alternatives (e.g., clickable links or menu items, etc.) and the user's selection of one of the alternatives can be used to impute greater interest pertaining to the selected alternative over the alternatives not selected. Further examples are shown and discussed as pertaining to FIG. 4B and FIG. 4C.

After a time lapse 135 of logging the activity initiating the client-side execution of scripts from an audience of users, the data management server 111 may examine the user input logs (see operation 136) to determine if one or more taxonomies should be updated (see operation 137). For example, a large number of users may generate a common set of conditions that are received by a tracking script (e.g., a client-side tracking script) over a certain period of time such that the conditions can be codified into a new taxonomy category for targeted online advertising purposes. Such a tracking script can be coded using any scripting language that supports conditional execution. Examples of such scripting languages that support conditional execution include JavaScript, ActionScript, Jscript, etc.

In some embodiments, data management server 111 receives information from web server 110, ad server 112, client device 106, and management interface device 113, to determine and deliver specialized content (e.g., an advertisement or impression) to include in web page 125 transmitted by web server 110 to client device 106. Data management server 111 determines specialized content through data management (e.g., aggregation, analysis, matching, filtering, segmentation, etc.) of multiple data sets from various data sources (e.g., first-party, second-party, third-party, online, off-line, mobile, media, etc.) according to various taxonomies and business logic to optimize online advertising, marketing, prospecting, ecommerce, and other activities. The data managed by data management server 111 can be internal data stored on and generated by data management server 111, and/or external data and/or data received from or transmitted to ad server 112, or externally received from and transmitted to any combination of servers and devices in environment 100.

The taxonomy and business logic deployed by data management server 111 on behalf of one or more data providers or advertisers are specified at the management interface device 113 (e.g., see operation 122). Input entered at management interface device 113 allows the data provider or advertiser to specify taxonomy and business logic to organize data (e.g., audience segments), normalize data (e.g., eliminate duplicates), define tag content, define target users, manage rights, ensure privacy rule compliance, etcetera. Various data reports (e.g. audience demographics, behavior tracking, impression statistics, etc.) produced by data management server 111 can also be viewed at management interface device 113.

A taxonomy can be codified using any know-in-the-art data structure and using any known-in-the-art arrangement or organization and can be stored using any known-in-the-art techniques or devices. Several examples of taxonomies are discussed herein, and are shown in later figures (e.g., see FIG. 4E).

Figure 2A:
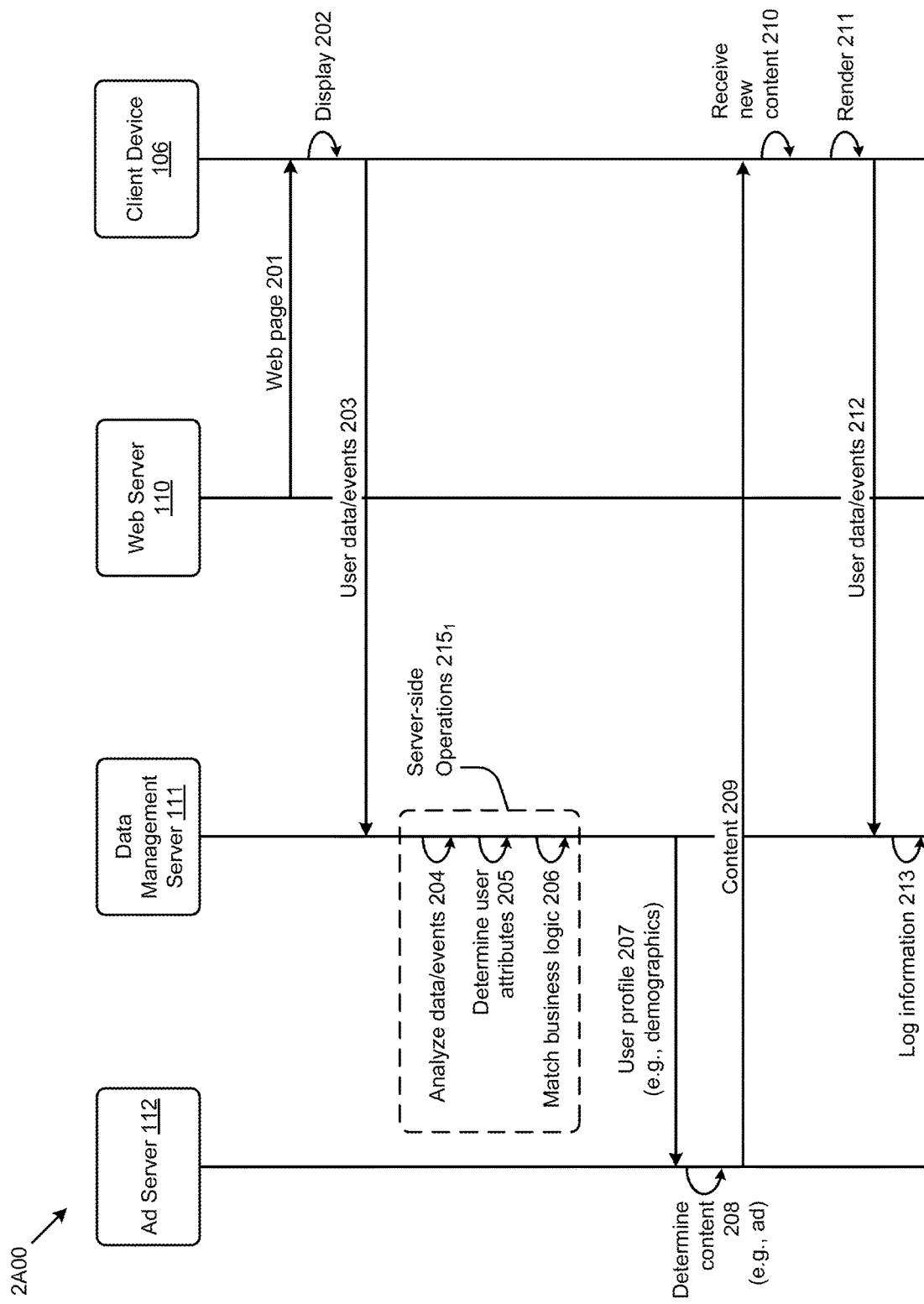
FIG. 2A depicts a protocol responsive to server-side user data analysis operations as used in systems for evaluating page content to determine user interest, according to some embodiments.

FIG. 2A depicts a protocol 2A00 responsive to server-side user data analysis operations as used in systems for evaluating page content to determine user interest. As an option, one or more instances of protocol 2A00 or any aspect thereof may be implemented in the context of the architecture and functionality of the embodiments described herein. Also, the protocol 2A00 or any aspect thereof may be implemented in any desired environment.

FIG. 2A is a protocol diagram depicting operations and communications by and between client device 106, web server 110, data management server 111, and ad server 112, from environment 100 of FIG. 1. The computing systems in protocol 2A00 are configured and initialized to enable web server 110 to send a web page 201 (e.g., travel website home page) to client device 106 in response to a user browsing (e.g., clicking on travel site search results) on client device 106. When the web page is received, client device 106 will display the web page (see operation 202) and capture subsequent user input and events at the client device 106 (e.g., login credentials, search criteria, etc.). Certain inputs and/or events (e.g., search button click) will send user data and events 203 (e.g., search criteria, cookie information, login credentials, etc.) to the data management server 111. Data management server 111 will then analyze the data and events (see operation 204) to determine user attributes (e.g., gender, income range, interests, location, purchases, etc.) by mapping the data and event information to available taxonomies established by data providers (see operation 205). Data management server 111 will access internal data stored on data management server 111 as well as access external data stored on ad server 112 to determine the most comprehensive set of user attributes. Data management server 111 then determines if the user attributes match the business logic established by one or more advertisers (see operation 206). For example, if one attribute of the user is determined to be that the user has an annual income greater than $100 k, and an advertiser established business logic to serve specific content (e.g., a luxury vacation package advertisement) to a target audience whose constituents have an annual income greater than $100 k, then there would be a match. When there is a match, data management server 111 can send the user profile 207 to the ad server 112 to determine the content (e.g., a selection of targeted advertisements) to send to the user (see operation 208). The ad server 112 can then generate content 209 (e.g., advertisement, impression, creative, tag, etc.) for sending to the client device for rendering (see operation 210 and operation 211). Additional user data and events 212 in response to the new content can be captured by the client device 106 and sent to the data management server 111. The data management server 111 can log such information (see operation 213) for subsequent analyses and reports.

For the operations illustrated in protocol 2A00, the primary evaluation of user attributes and matching to advertiser business logic (e.g. operations 204, 205, and 206) are performed on data management server 111 and are described collectively as server-side operations. Such server-side operations $215_1$ work well when user attributes can be readily represented in the attribute taxonomy using relatively broad segmentation (e.g., gender, age ranges, income ranges, etc.). However, as advertisers drive to define their targets based on user data and interests that are increasingly more detailed (e.g., specific departure city, departure date, etc.), the scale of the taxonomy and computing capability required to account for all such detailed combinations can become limiting. Other scaling challenges with such server-side approaches include extending the Boolean comparison operators in the business logic beyond "equals" or an exact match (e.g., to include greater than, less than, less than or equal to, etc.), and tracking and identifying the specific affiliate among multiple affiliates that drives a conversion. Additional aspects of an approach for addressing these issues and challenges are disclosed herein.

Figure 2B:
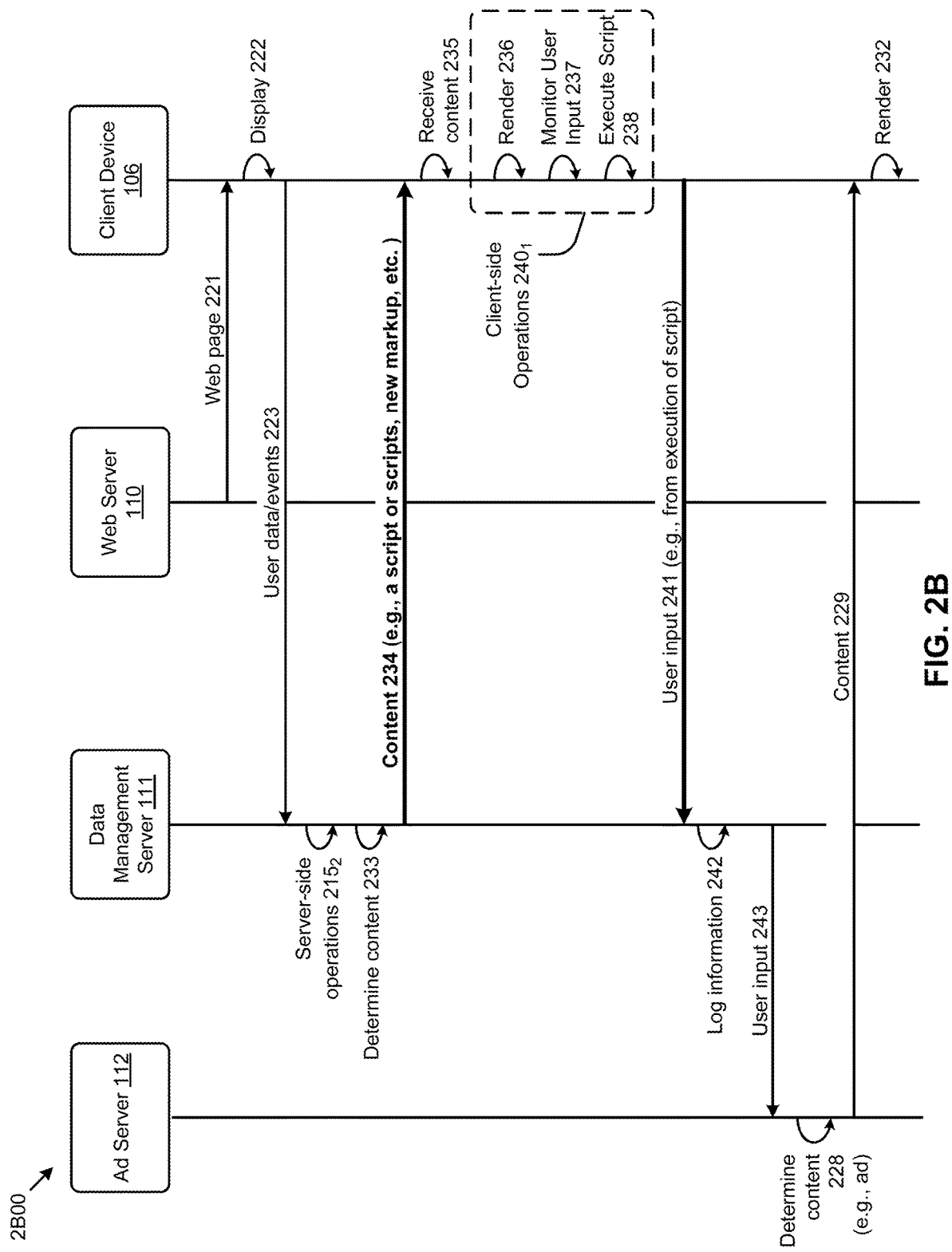
FIG. 2B depicts a protocol responsive to client-side user data analysis operations as used in systems for evaluating page content to determine user interest, according to some embodiments.

FIG. 2B depicts a protocol 2B00 responsive to client-side user data analysis operations as used in systems for evaluating page content to determine user interest. As an option, one or more instances of protocol 2B00 or any aspect thereof may be implemented in the context of the architecture and functionality of the embodiments described herein. Also, the protocol 2B00 or any aspect thereof may be implemented in any desired environment.

FIG. 2B is a protocol diagram depicting operations and communications on and among client device 106, web server 110, data management server 111, and ad server 112. The computing systems in protocol 2B00 are configured and initialized to enable web server 110 to send a web page 221 (e.g., travel website home page) to client device 106 in response to a user browsing (e.g., clicking on travel site search results) on client device 106. When the web page is received, client device 106 will display the web page (see operation 222) and capture subsequent user input and events at the client device 106 (e.g., login credentials, search criteria, etc.). Certain user inputs and/or user events (e.g., search button click) and/or HTML events that occur by rendering of the web page by the device (e.g., a page finishing starting to load, a page finishing loading, other XML DOM events, etc.) will send user data and events 223 (e.g., search criteria, cookie information, login credentials, etc.) to the data management server 111. Data management server 111 then performs a set of server-side operations $215_2$ (as described in FIG. 2A), to access available data (e.g., business logic) to determine a set of content 234 to return to the user (see operation 233). In one or more embodiments and examples, the content 234 can include scripts to be executed in response to certain user interactions at the client device 106.

With this approach, additional response capabilities are made available to the advertiser. For example, an advertiser may want to learn more about the user than is available in current taxonomies and segmentations before determining an advertisement or tag to present. Specifically, the advertiser wants to know what the user is currently viewing or doing on the web page displayed on client device 106 before serving a specific advertisement or tag. Or, the advertiser might want to populate a taxonomy based on a behavior that a user takes while interacting with the web page displayed on client device. Strictly as examples, questions pertaining to user behaviors that an advertiser might want to observe (and derive aggregate statistics) include, "What segment of users scroll fast?", "What segment of users scroll slowly?", "What segment of users hover over the shopping cart icon?", etc.

In some such cases, the advertiser would set up additional business logic to fire certain tags based on specific instantaneous information from the user web page (e.g., user clicks, user selections, other user actions, etc.). This information can sometimes be referred to as being received as part of a "page hint" or "phint" or "Phint". To facilitate this type of response or action, data management server 111 will send the content 234 (e.g., including scripts and new HTML) to be received by the client device 106 (see operation 235).

Continuing, client device 106 will render the new content (see operation 236), monitor subsequent user input and events (see operation 237), and execute scripts sent by data management server 111 and included in the new content (see operation 238). Execution of the scripts on client device 106 (e.g., client-side) allows the targeting logic to use—as inputs—the specific instantaneous information about the user when determining its response. Further, execution of the scripts on client device 106 allows the targeting logic to include extensive conditional logic, such as Boolean logic expressions, in the client-side analysis. When the scripts have executed, client device 106 will display any conditional content as may be described by the scripts. If one or more target conditions are met, client device 106 will also send information (e.g., user input 241) back to data management server 111 to log results. Throughout this process, data management server 111 will log information (e.g., data, events, attributes, match results, additional content, etc.) for subsequent analyses and reports (see operation 242). In exemplary embodiments, logging and/or logging messages are sent (or not sent) and/or defined so as to avoid double counting of user events or impressions. In some situations logging messages can be forwarded to the ad server 112, which then can further augment the content of that page, and/or, in some situations, logging messages can be forwarded to the web server 110, which might generate new web-pages.

The additional user input (e.g., see user input 241) captured at the client device 106 and sent to the data management server 111 can then be forwarded (see user input 243) to the ad server 112 to determine the content (e.g., a selection of targeted advertisements) to send to the user (see operation 228). The ad server 112 can then send the content 229 (e.g., advertisement, impression, creative, tag, etc.) to the client device 106 for rendering (see operation 232).

The operations illustrated in protocol 2B00 include a set of page content evaluation operations (e.g., operations 236, 237, and 238) to determine user attributes that are performed on the client device 106. Such operations are described collectively as client-side operations $240_1$.

Figure 2C:
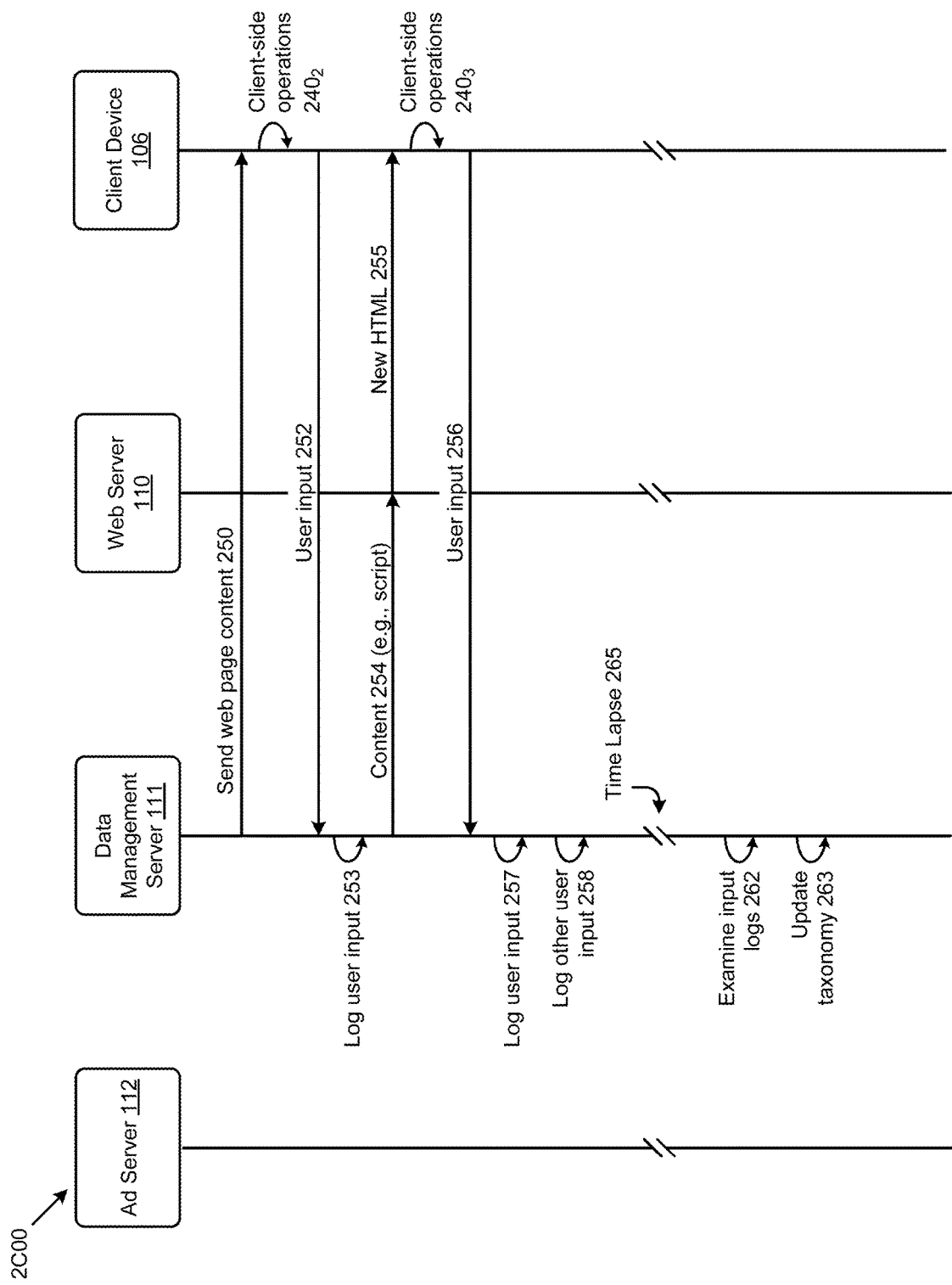
FIG. 2C is a diagram to illustrate log file analysis and taxonomy update operations in systems for evaluating page content to determine user interest, according to some embodiments.

FIG. 2C is a diagram 2C00 to illustrate log file analysis and taxonomy update operations in systems for evaluating page content to determine user interest. As an option, one or more instances of diagram 2C00 or any aspect thereof may be implemented in the context of the architecture and functionality of the embodiments described herein. Also, the diagram 2C00 or any aspect thereof may be implemented in any desired environment.

FIG. 2C is a protocol diagram depicting operations and communications on and among client device 106, web server 110, data management server 111, and ad server 112. The computing systems in diagram 2C00 are configured and initialized to enable the data management server 111 to send web page content 250 (e.g., including scripts) to the client device 106. A set of client-side operations $240_2$ (as described in FIG. 2B) can then be executed such that a set of user input 252 is sent to the data management server 111 to be logged (see operation 253). At a later time, another set of web page content 254 (e.g., including scripts) can be sent to the web server 110, which in turn can send new HTML 255 including the scripts for inclusion in a web page displayed at the client device 106. A set of client-side operations $240_3$ can then be executed such that a set of user input 256 is sent to the data management server 111 to be logged (see operation 257). Data management server 111 can further log user input from other users at other client devices (see operation 258). After a time lapse 265, a collection of user input logs can be captured and stored (e.g., in a database) for examination (see operation 262). More specifically, the collection of user input logs can be examined to determine if one or more taxonomies should be updated (see operation 263). For example, a large number of users may generate a common set of conditions (e.g., user input) that are received by a client-side tracking script and logged by data management server 111 over a certain period of time such that the conditions can be codified into a new taxonomy category for targeted online advertising purposes.

Figure 3:
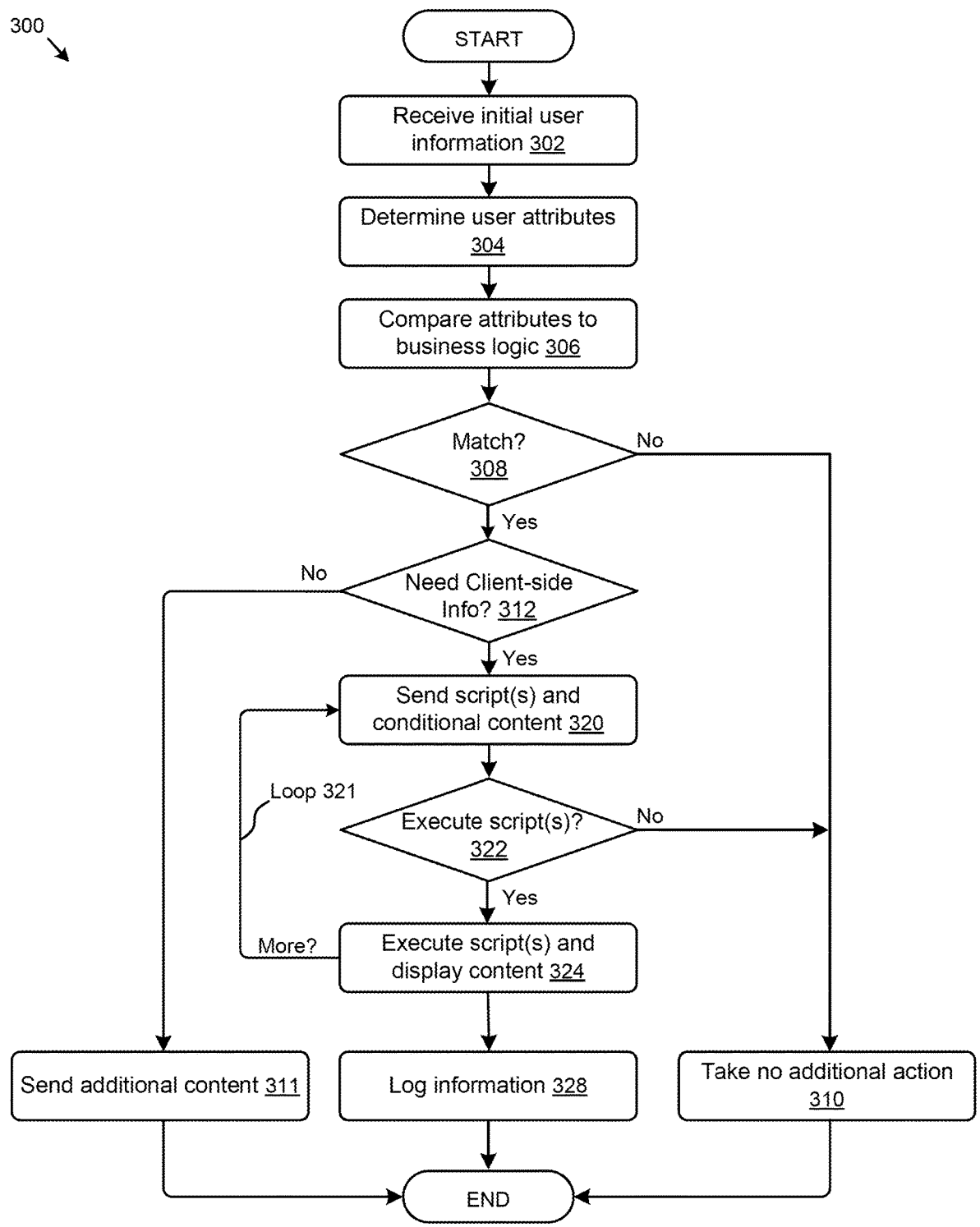
FIG. 3 presents a flowchart for determining targeting actions to take based on both server-side and client-side targeting operations as used in systems for evaluating page content to determine user interest, according to an embodiment.

FIG. 3 presents a flowchart 300 for determining targeting actions to take based on both server-side and client-side targeting operations as used in systems for evaluating page content to determine user interest. As an option, one or more instances of flowchart 300 or any aspect thereof may be implemented in the context of the architecture and functionality of the embodiments described herein. Also, the flowchart 300 or any aspect thereof may be implemented in any desired environment.

As shown in FIG. 3, and with reference to the operational units of environment 100, the first step in the flowchart is to receive initial user information (see operation 302) by data management server 111 from client device 106. Data management server 111 will then determine user attributes (see operation 304) by mapping the initial user information to various taxonomies, and then compare attributes to business logic (see operation 306) to determine if there is a match (see decision 308). At this point, the business logic will dictate the next set of actions in the process flow.

If there is no match between user attributes and the business logic (see "No" path from decision 308), then data management server 111 will take no additional action (see operation 310). If there is a match (see "Yes" path from decision 308) then the business logic will dictate whether client-side operations are required (see decision 312). If client-side operations are not required (see "No" path from decision 312), data management server 111 will send additional content (see operation 311) specified by the business logic at operation 306 to web server 110 and on to client device 106 in the form of a new web page for subsequent display of additional content.

If client-side operations are required (see "Yes" path from decision 312), data management server 111 will send one or more scripts and conditional content (see operation 320) specified by the business logic at operation 306 to web server 110 and on to client device 106 in the form of a new web page. User activity (e.g., web page information) at client device 106 will then be monitored to determine if one or more scripts should be executed (see decision 322). If no scripts are executed (see "No" path from decision 322), then the client device 106 will take no additional action (see operation 310). If one or more scripts are executed in response to web page information (see "Yes" path of decision 322), a portion (e.g., including none) of the conditional content as specified by the script execution results is displayed (see operation 324). In some cases, execution of a script will invoke further requests for scripts and/or conditional content, and loop 321 is taken, possibly repeatedly, to receive one or more scripts and/or conditional content. The script execution results will also determine a set of information to communicate to data management server 111 for logging (see operation 328).

Figure 4A:
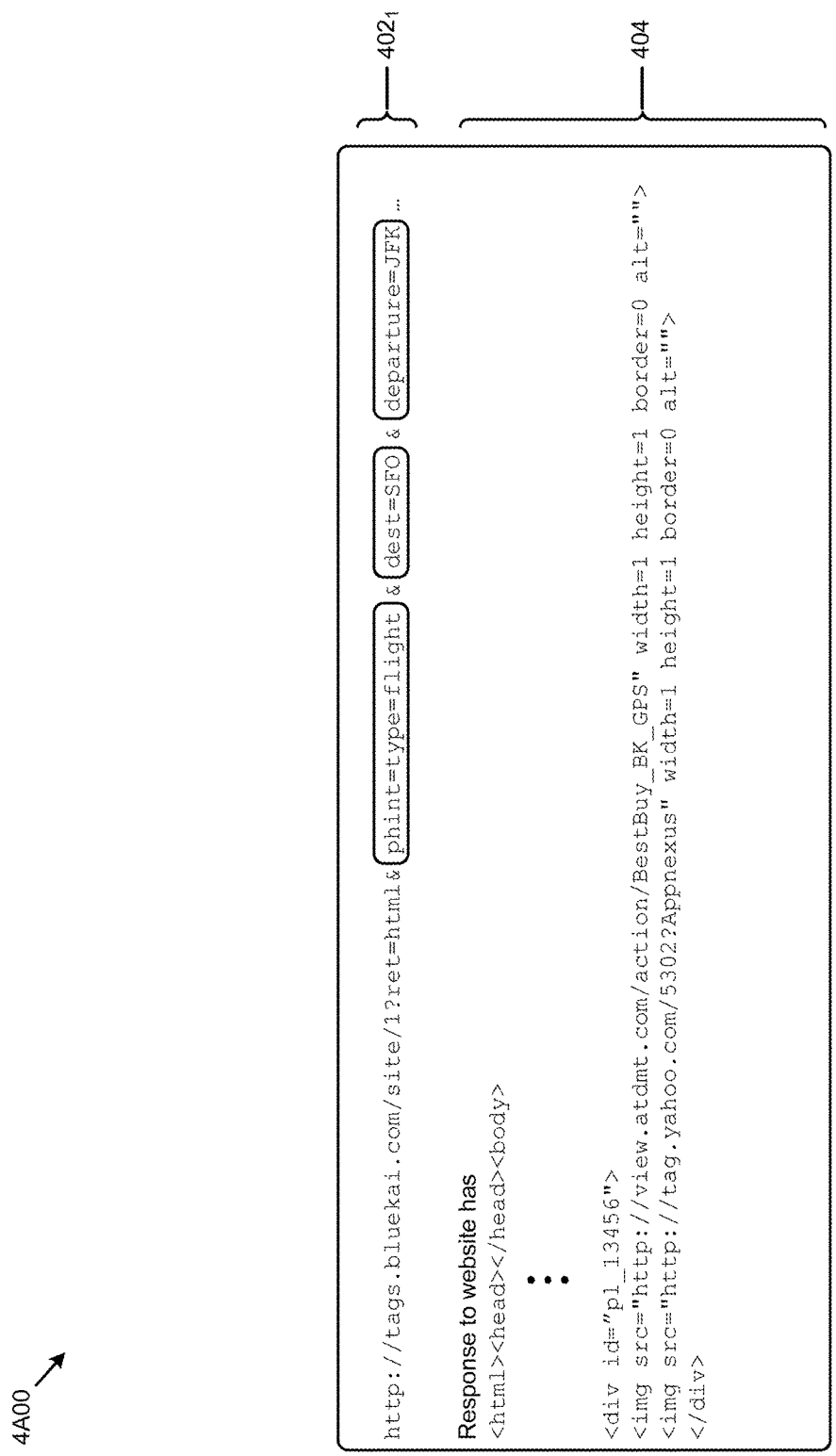
FIG. 4A depicts samples of request and response code as used in systems for evaluating page content to determine user interest, according to one embodiment.

FIG. 4A depicts samples of request and response code as used in systems for evaluating page content to determine user interest. As an option, one or more instances of samples 4A00 or any aspect thereof may be implemented in the context of the architecture and functionality of the embodiments described herein. Also, the samples 4A00 or any aspect thereof may be implemented in any desired environment.

As shown in FIG. 4A, samples 4A00 comprise sample code representing an ad tag request $402_1$ and sample code representing an ad tag response 404 from an ad tag response module. Ad tag request $402_1$ can be embedded in a web page and sent to one or more servers (e.g., data management server 111) following certain activity (e.g., entering search form data) and triggering events (e.g., clicking search button) as may be initiated by a user (e.g., user 114 at client device 106). Ad tag request $402_1$ is structured such that it queries a server at a specific uniform resource locator or URL (e.g., "tags.bluekai.com") for some type of response (e.g., content, further action, etc.). Ad tag request $402_1$ is further structured to include certain information from the web page or "phints" (e.g., "type=flight", "dest=SFO", "departure=JFK") in the request to potentially be used in determining the response. When ad tag request $402_1$ is received and processed, ad tag response 404 is delivered back to the browser. Ad tag response 404 can be determined in part by evaluation of ad tag request $402_1$ and related information (e.g., user demographics) in consideration of audience segmentation taxonomies, advertiser business logic or rules, etcetera. In this case, ad tag response 404 is structured to include new tag content to be associated with the web page the user is viewing. The two new tags of ad tag response 404 are structured as pixel images (e.g., as 1 pixel by 1 pixel images) and can be referred to as pixel tags (or beacons, or page tags, or web bugs, or tracking bugs, or tracking pixels, etc.). The servers (e.g., ad servers) at the URLs of each new tag will use the tags to monitor user behavior at the web page and deliver additional content (e.g., a banner ad) to the web page. In cases where the content of ad tag response 404 contains no scripts, then no client-side targeting operations are required. Sample HTML depicting client-side targeting operations are shown in FIG. 4B.

FIG. 4B depicts samples of requests and response codes responsive to client-side targeting operations as used in systems for evaluating page content to determine user interest. As an option, one or more instances of samples 4B00 or any aspect thereof may be implemented in the context of the architecture and functionality of the embodiments described herein. Also, the samples 4B00 or any aspect thereof may be implemented in any desired environment.

As shown in FIG. 4B, samples 4B00 comprise sample code representing an ad tag request $402_2$ and sample code representing an ad tag response 406. Ad tag request $402_2$ can be embedded in a web page and sent to one or more servers (e.g., data management server 111) following certain activity (e.g., entering search form data) and triggering events (e.g., clicking search button) as may be initiated by a user (e.g., user 114 at client device 106). Ad tag request $402_2$ is structured such that it queries the server at a specific uniform resource locator or URL (e.g., "tags.bluekai.com") for some type of response (e.g., content, further action, etc.). Ad tag request $402_2$ is further structured to include certain information from the web page or "phints" (e.g., "type=flight", "dest=SFO", "departure=JFK") in the request to potentially be used in determining actions based on phints. When ad tag request $402_2$ is received and processed, ad tag response 406 is delivered back to the browser. Ad tag response 406 can be determined in part by evaluation of ad tag request $402_2$ and related information (e.g., user demographics) in consideration of audience segmentation taxonomies, advertiser business logic or rules, etcetera. In this case, ad tag response 406 is structured to include new conditional tag content and scripts to determine the conditional content to be displayed. As distinguished to the implementations shown in samples 4A00, the scripts in ad tag response 406 of samples 4B00 use the computing resources of the client device (e.g., client device 106) and specific instantaneous user information or phints included in ad tag request $402_2$ and/or present on the current web page the user is browsing. Any conditional tags that are now fired as the result of the execution of the client-side tracking scripts will provide the advertiser with a much more focused targeting opportunity and result.

Figure 4C:
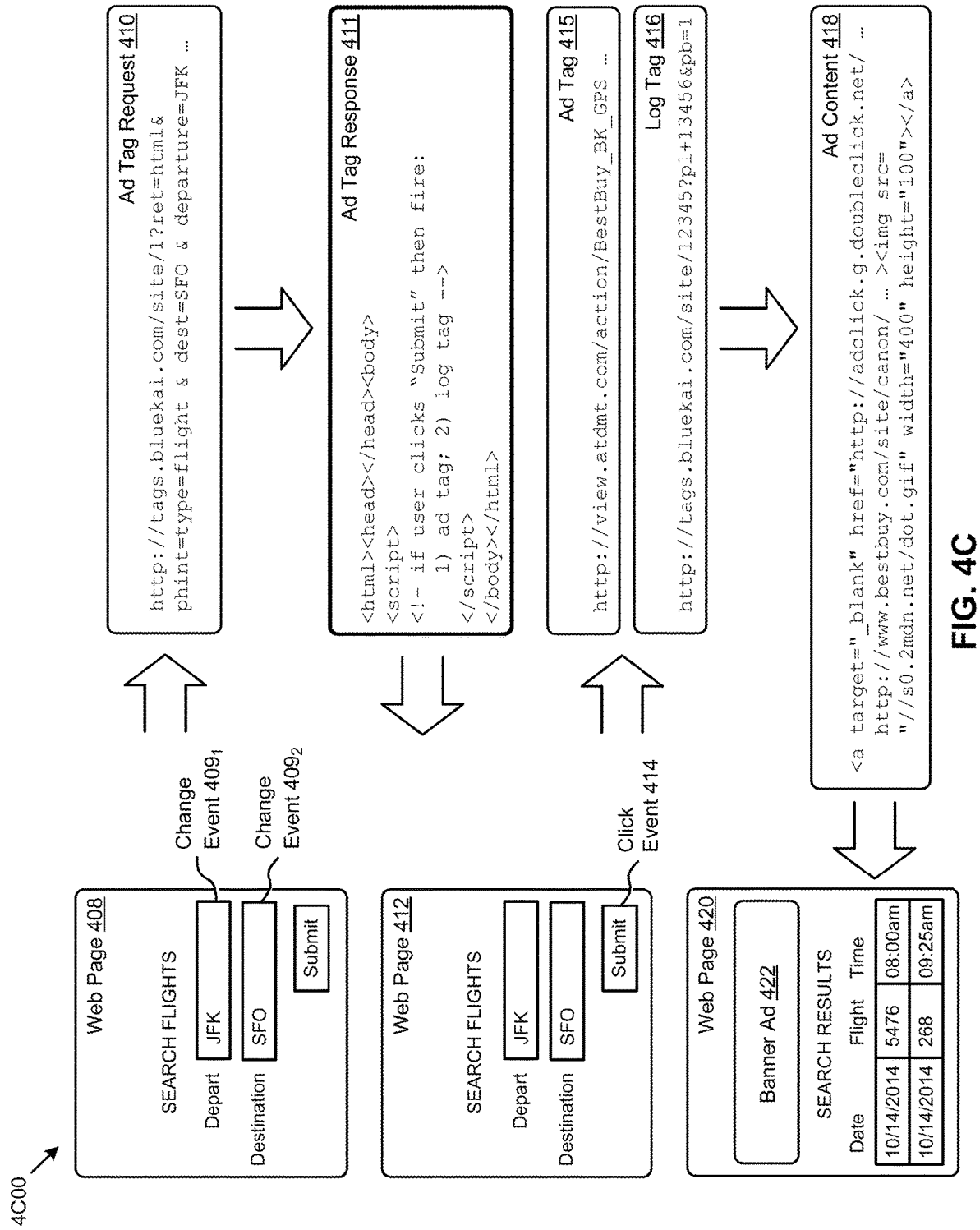
FIG. 4C presents a flow to illustrate client-side targeting operations as used in systems for evaluating page content to determine user interest, according to an embodiment.

FIG. 4C presents a flow 4C00 to illustrate client-side targeting operations as used in systems for evaluating page content to determine user interest. As an option, one or more instances of flow 4C00 or any aspect thereof may be implemented in the context of the architecture and functionality of the embodiments described herein. Also, the flow 4C00 or any aspect thereof may be implemented in any desired environment.

The flow 4C00 shown in FIG. 4C illustrates interactions between request and response code with one or more web pages displayed on a client device (e.g., client device 106). Specifically, flow 4C00 shows a web page 408 being displayed. For example, the web page 408 can be a page from a travel website that allows a user to "Search Flights". As shown, the user has entered a departure airport of "JFK" and a destination airport of "SFO". The HTML code of web page 408 is such that entering the text "JFK" and "SFO" triggers a change event $409_1$ and a change event $409_2$, respectively, initiating an ad tag request 410. As described in FIG. 4B, the ad tag request 410 is structured to query a server at a specific URL (e.g., "tags.bluekai.com") and includes the entered information from the web page 408 (e.g., "dest=SFO", "departure=JFK"). When ad tag request 410 is received and processed, ad tag response 411 is sent back to the browser application at the client device (e.g., through a network port). In some cases, the ad tag response 411 will not cause modification of the content displayed to the user (e.g., see the cases depicted by web page 412). In other cases, the ad tag response 411 will cause modification of the content displayed to the user (e.g., by causing an ad to be rendered). In some cases, the ad tag response 411 can include HTML response code comprising a tracking script that will monitor user input for a particular click event 414 (e.g., click of a "Submit" button), and when the particular click event 414 occurs, the tracking script will fire an ad tag 415 and a log tag 416. Further, the tracking script can package an ad tag 415 to be sent to a server (e.g., at "view.atdmt.com") which in turn can determine a set of ad content 418 to return to the client device (e.g., through a network port). Additionally, a log tag 416 can be sent to an event log module and/or a data management server (e.g., at "tags.bluekai.com") to log the occurrence and other information pertaining to the monitored events. As shown, the ad content 418 can comprise code for a banner ad 422 to be displayed along with a set of flight search results rendered on a new web page 420.

Figure 4D:
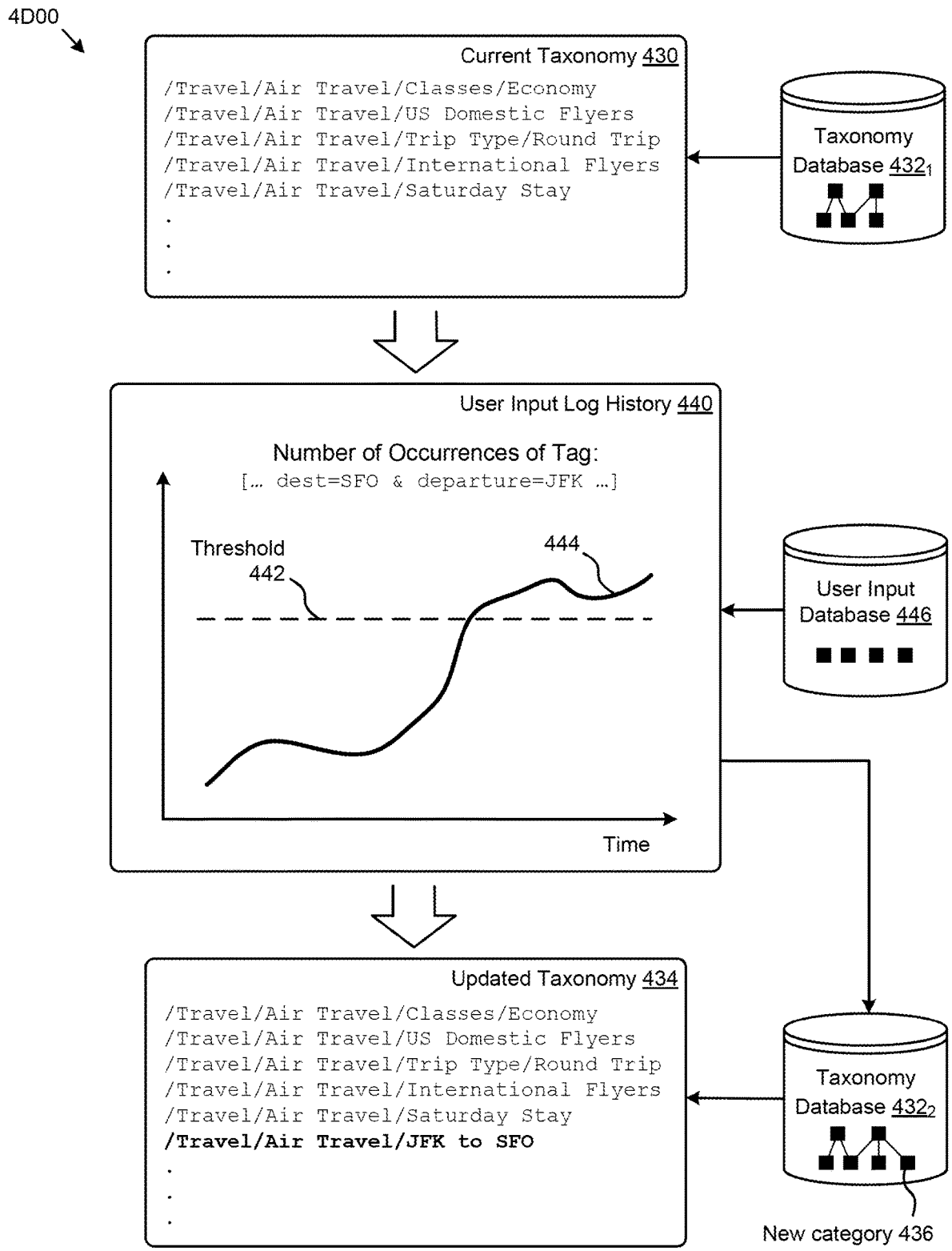
FIG. 4D is a flow to illustrate taxonomy updates generated in response to client-side targeting operations to determine user interest, according to an embodiment.

FIG. 4D is a flow 4D00 to illustrate taxonomy updates generated in response to client-side targeting operations to determine user interest. As an option, one or more instances of flow 4D00 or any aspect thereof may be implemented in the context of the architecture and functionality of the embodiments described herein. Also, the flow 4D00 or any aspect thereof may be implemented in any desired environment.

As shown in flow 4D00, a data management server (e.g., data management server 111) might have access to a current taxonomy 430 of user interest categories stored in an instance of a taxonomy database $432_1$ (e.g., a relational database) for use in targeted online advertising. For example, as shown, the current taxonomy 430 can comprise one or more categories related to an interest in "Travel" such that certain advertising related to the one or more categories can be presented to a user having such categories in a user profile. The current taxonomy 430 can further comprise one or more other categories related to "Travel" or one or more other interests. In the example shown, the current taxonomy 430 has no category associated with specific flight destination and departure information (e.g., airport code) as such information can be deemed too specific to include in the current taxonomy 430. In such a case, client-side tracking scripts can be used as described herein to capture user information (e.g., flight destination and departure information, browsing behavior, etc.) from the user as the user interacts with the web page. Such captured user information can be used with techniques to update the taxonomy. For example, detecting a user selection of a menu item given as "dest=SFO" can be deemed to capture user interest in travel to San Francisco (or at least to San Francisco's SFO airport). As another example, a client-side tracking script can detect that a user spends time hovering over a particular web page element (e.g., over a button, or over an iFrame, or over a particular advertisement, etc.). Further, strictly as examples, quantitatively-filtered hovering events can be deemed to indicate user interest pertaining to semantics of particular web page elements. A client-side tracking script can track actions that have explicit results (e.g., a menu selection, a button press, etc.), and/or can concurrently track user actions that produce inferences of user interest. In some cases, a taxonomy (e.g., current taxonomy 430) might not be present, or might not be populated, or might not be populated with any items related to pertinent business logic. In such cases, a client-side tracking script can nevertheless be delivered to the client device to track client side behaviors, which behaviors can be deemed to expresses explicit or inferred user interest. As such, behaviors can be determined or inferred from actions, and any of a range of user actions can be detected by a client-side tracking script. Furthermore, a particular user action can be determined to be one from among a group of candidate user actions.

As heretofore described (see ad tag response 411) a client-side tracking script might not rely on a taxonomy at all, and rather merely fire an event to an ad server. The determination of if, and when, and under what conditions the event is sent to an ad server can be encoded into the client-side tracking script. Any forms of logic can be implemented in a client-side tracking script. In some embodiments, web based graphical user interface (see FIG. 5A and FIG. 5B) is provided to allow advertisers and others to manage online business logic and other criteria (e.g., tag content, affiliate websites, reports and analytics, etc.) related to targeted online advertising. Various criteria (e.g., business logic) can be used to determine what user information or interests are to be captured through the operation of the client-side tracking script.

In one or more embodiments, user information can be captured and logged in a user input database 446 (e.g., sequential record database) and tracked in a user input log history 440. Specifically, as shown in the example of flow 4D00, the user input log history 440 tracks over time the number of occurrences of a received ad request tag comprising the terms "dest=SFO" and "departure=JFK" (see curve 444). In one or more embodiments, a threshold 442 can be established such that a new category 436 can be added to an updated instance of the taxonomy database $432_2$ when the number of occurrences has surpassed the threshold 442. As highlighted in an updated taxonomy 434, the new category 436 corresponds to the taxonomy category "/Travel/Air Travel/JFK to SFO", which can be used in further targeted online advertising campaigns.

FIG. 4E depicts representation of taxonomy component representation 4E00 and taxonomy path representation 4E50. The representations or any aspect thereof may be implemented in any desired environment.

As shown, taxonomy component representation 4E00 depicts components used in defining and codifying a taxonomy. The codification of a taxonomy class (e.g., identified by a taxonomy identifier) can use a portion or subset of the components, or can use all of the components. The components can be organized into a semantically hierarchical representation, and/or can be organized and represented as a path such as is depicted by taxonomy path representation 4E50. A path can refer to a hierarchical path, or can refer to a sequential path as may be traversed by a user, or by a computer-implemented process.

Figure 5A:
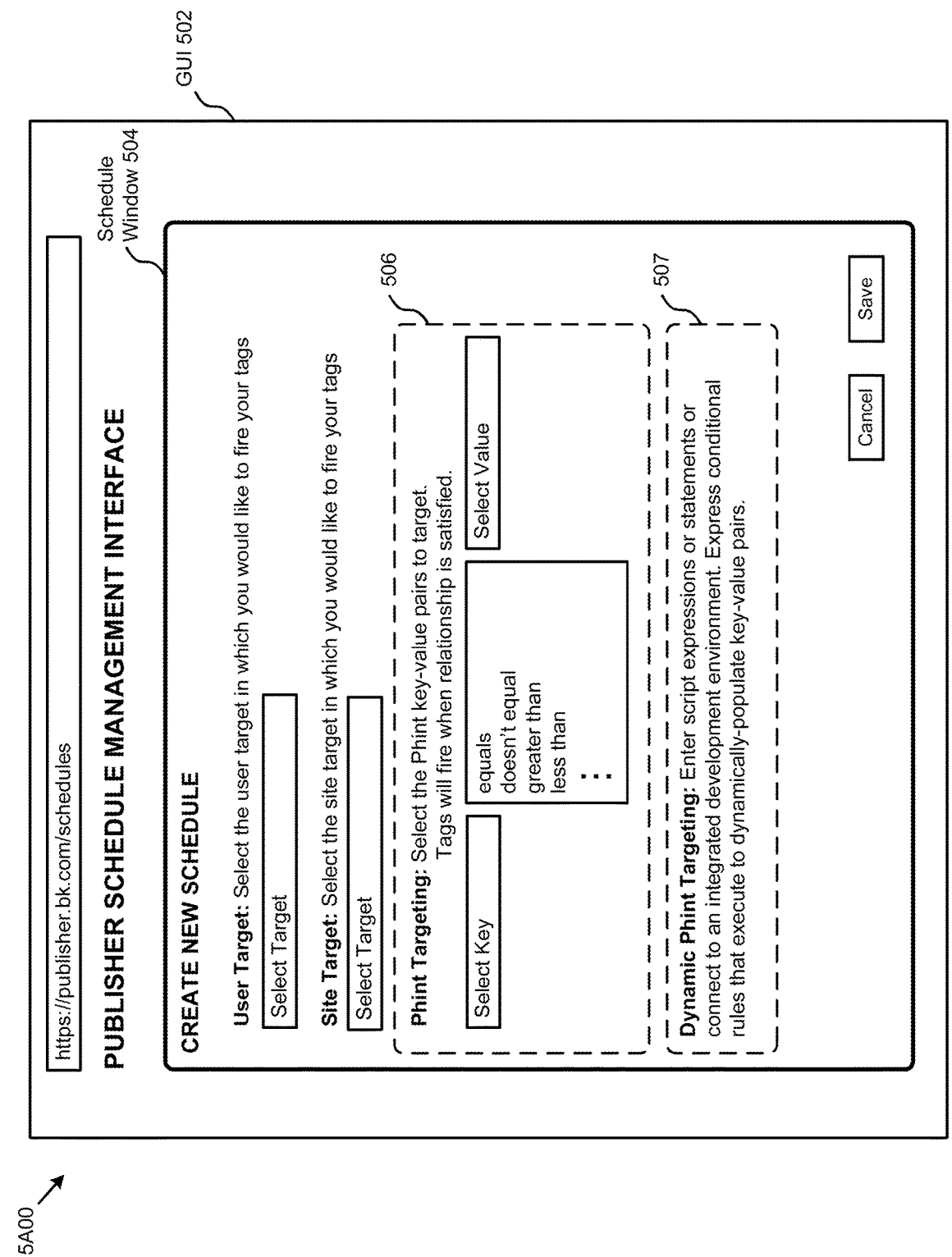
FIG. 5A depicts a target specification entry form used to identify client-side targeting specifications as used in systems for evaluating page content to determine user interest, according to one embodiment.

FIG. 5A depicts a target specification entry form 5A00 used to identify client-side targeting specifications as used in systems for evaluating page content to determine user interest. As an option, one or more instances of target specification entry form 5A00 or any aspect thereof may be implemented in the context of the architecture and functionality of the embodiments described herein. Also, the target specification entry form 5A00 or any aspect thereof may be implemented in any desired environment.

Some embodiments of target specification entry form 5A00 can be a web-based graphical user interface or GUI 502 designed to allow advertisers and others to manage online business logic and other criteria (e.g., tag content, affiliate websites, reports and analytics, etc.) related to targeted online advertising. GUI 502 can be presented to the advertiser by a browser application on a computing device such as management interface device 113. In one embodiment, GUI 502 will display a schedule window 504 when the advertiser desires to establish a new schedule for a certain user target. Schedule window 504 presents various input entry elements (e.g., dropdown selections, text boxes, etc.) through which the advertiser can establish schedule attributes. Elements highlighted in schedule window 504 are the phint targeting attributes 506. Phint targeting attributes 506 enable, in part, the approaches for evaluating page content to determine user interest described herein. Specifically, phint targeting attributes comprise specific key-value pairs (e.g., price-$14.99, destination-SFO, etc.) that are expected to be available on a web page that a user is browsing. The form facilitates defining relationships between the keys and respective values, which relationships are sometime in the form of Boolean operators (e.g., equals, doesn't equal, greater than, etc.), which operators may operate over one or more operands (e.g., key strings or menu item strings other values determined from an element of the web page). Once the phint targeting attributes 506 and other settings for this schedule are selected, a new business rule for the advertiser is created including, in part, scripts to evaluate, through client-side operations executed on a client device (e.g., client device 106), the phint targeting attributes 506 against the specific instantaneous web page content and activity of a potential target user.

The aforementioned techniques to specify phints uses logic such as is shown in FIG. 5A as pertaining to phint targeting attributes 506. Additionally, logic of any complexity can be performed by client-side targeting operations. In particular, client-side targeting operations can include forms of dynamic phint targeting. As shown in the region 507, a script expression and/or a script statement or statements can be entered in region 507. In some embodiments, dynamic phint targeting can be facilitated using an integrated development environment (IDE). Script and/or other code as entered in such an IDE or other script entry window can be used in client-side targeting operations, which can in turn be used to accomplish dynamic phint population based on events that occur after delivery of the targeting script.

Figure 5B:
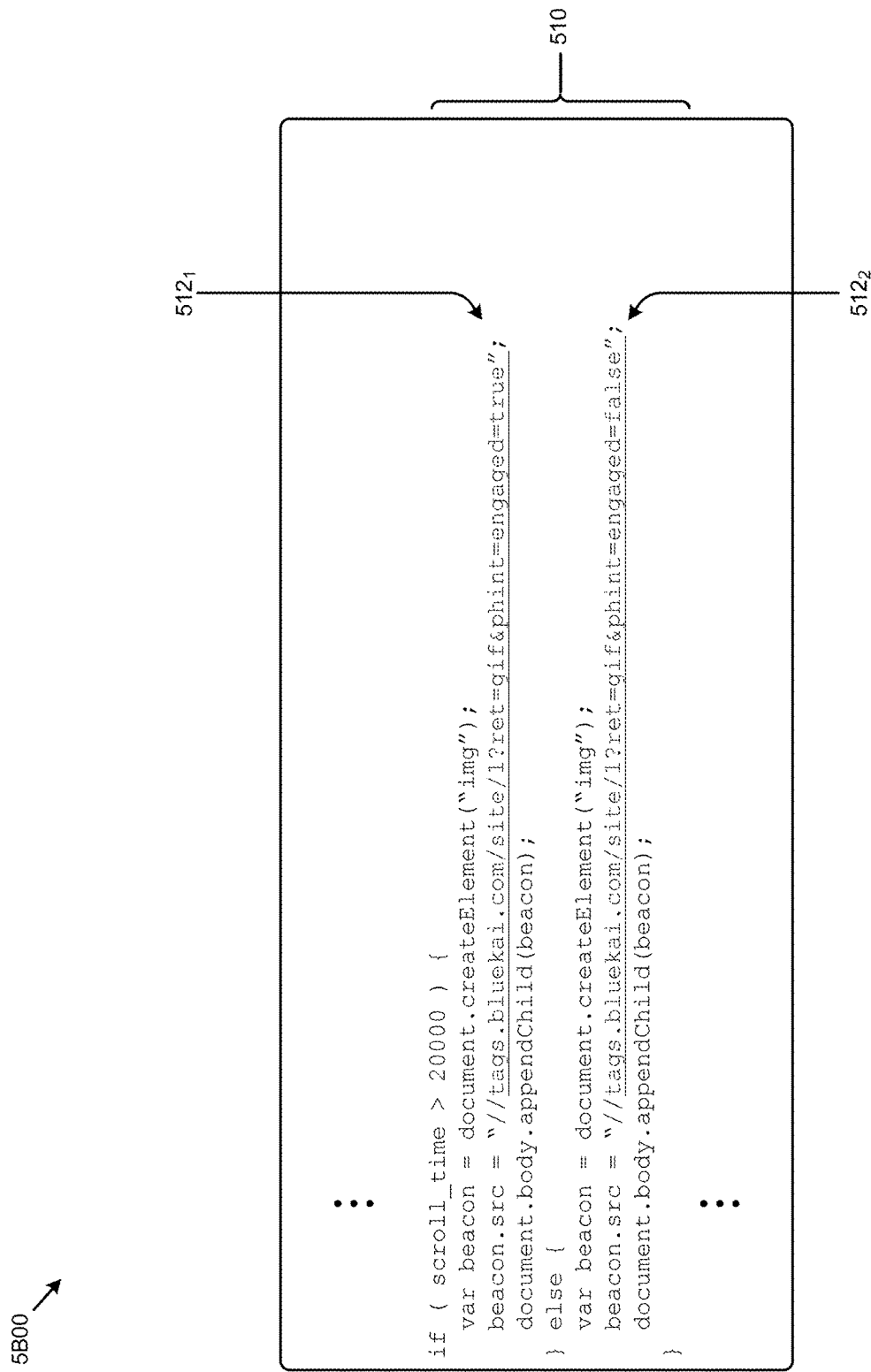
FIG. 5B depicts a script entry form used to codify dynamically-determined targeting specifications as used in systems for evaluating page content to determine user interest, according to one embodiment.

FIG. 5B depicts a script entry form 5B00 used to codify dynamically-determined targeting specifications as used in systems for evaluating page content to determine user interest. The window 510 depicts a code segment using a scripting language. The shown script makes a determination as to a degree of engagement by the user based on a measured scroll time (e.g., see conditional test expression "scroll_time>20000"). Based on the result of that determination, one or another action is taken. In the example of FIG. 5B, if the scrolling time is deemed to be long, then the user is deemed to be engaged, and a beacon is sent with a dynamically-determined phint $512_1$ encoded into the beacon URL (e.g., see "phint=engaged=true"). If the scrolling time is short, then the user is deemed to be less engaged, and a beacon is sent with a different key-value pair in the dynamically-determined phint $512_2$ that is encoded into the beacon URL (e.g., see "phint=engaged=false"). The shown dynamically-determined phints are codified as key-value pairs, however key-value pairs are merely one technique used to codify aspects of dynamically-determined page hints. Moreover, the shown statements comprising the beacons (e.g., the statements comprising the phints 512) are merely examples of items that are rendered when a particular condition is satisfied, and not rendered when the particular condition is not satisfied.

Figure 6:
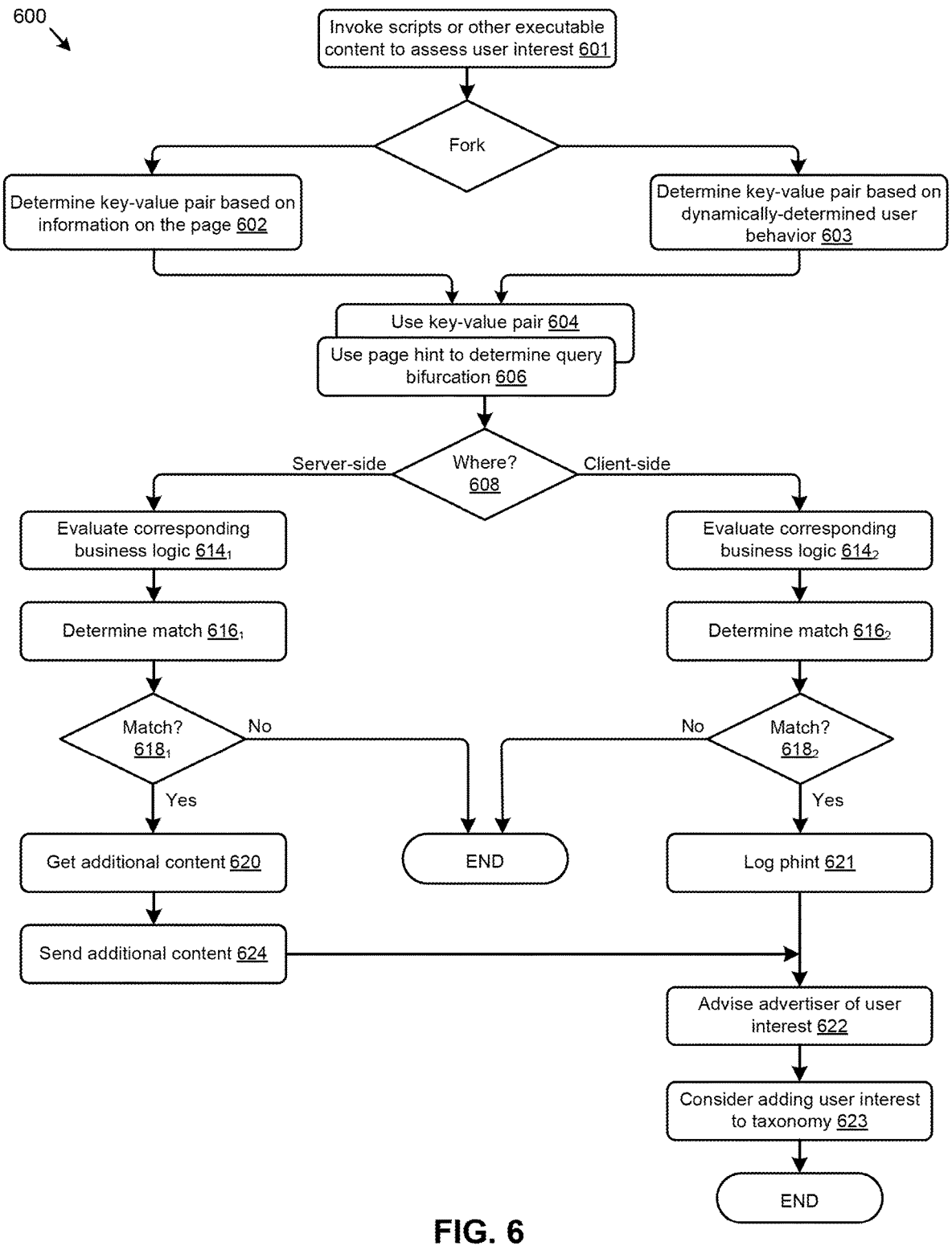
FIG. 6 is a flowchart of a system to evaluate page content to determine user interest, according to an embodiment.

FIG. 6 is a flowchart 600 of a system to evaluate page content to determine user interest. As an option, one or more instances of flowchart 600 or any aspect thereof may be implemented in the context of the architecture and functionality of the embodiments described herein. Also, the flowchart 600 or any aspect thereof may be implemented in any desired environment.

The flowchart begins by invoking scripts or other executable content to assess user interest (see operation 601). In the shown embodiment, concurrent assessments commence. Specifically, one set of operations assesses user interest based on information found on the page, possibly based on a user-identified menu selection (see assessment 602), while another set of operations assesses user interest based on user behaviors that are dynamically-determined (see assessment 603).

In exemplary cases, the user interest is codified using key-value pairs (see operation 604) in combination with page hints (see operation 606). Based on the assessments of the user interests, a decision is made as to where (e.g., server-side, client-side) additional information can be retrieved and processed (see decision 608). In some situations, both paths from decision 608 can operate in parallel. For example, when it is determined that at least some of the user demographics might be found on the server side (e.g. in a taxonomy), then the left branch might be invoked (see "Server-side" path from decision 608). Concurrently, the right branch can be invoked, and operations can be performed on the client (see "Client-side" path from decision 608).

Server-side operations include retrieving corresponding business logic (see operation $614_1$), determining a match (see operation $616_1$), executing a match conditional (see decision $618_1$, retrieving additional content (see operation 620), and sending the additional content to the client for processing (see operation 624). In some cases there is no additional content and the flow ends (see "No" path from decision $618_1$).

Client-side operations may include retrieving corresponding business logic (see operation $614_2$), determining a match (see operation $616_2$), executing a match conditional (see decision $618_2$), logging the occurrence of the phint (see operation 621), advising the advertiser of the specific matching user interest (see operation 622), and considering adding the user interest to the taxonomy (see operation 623). In some cases there is no match and the flow ends (see "No" path from decision $618_2$).

Figure 7A:
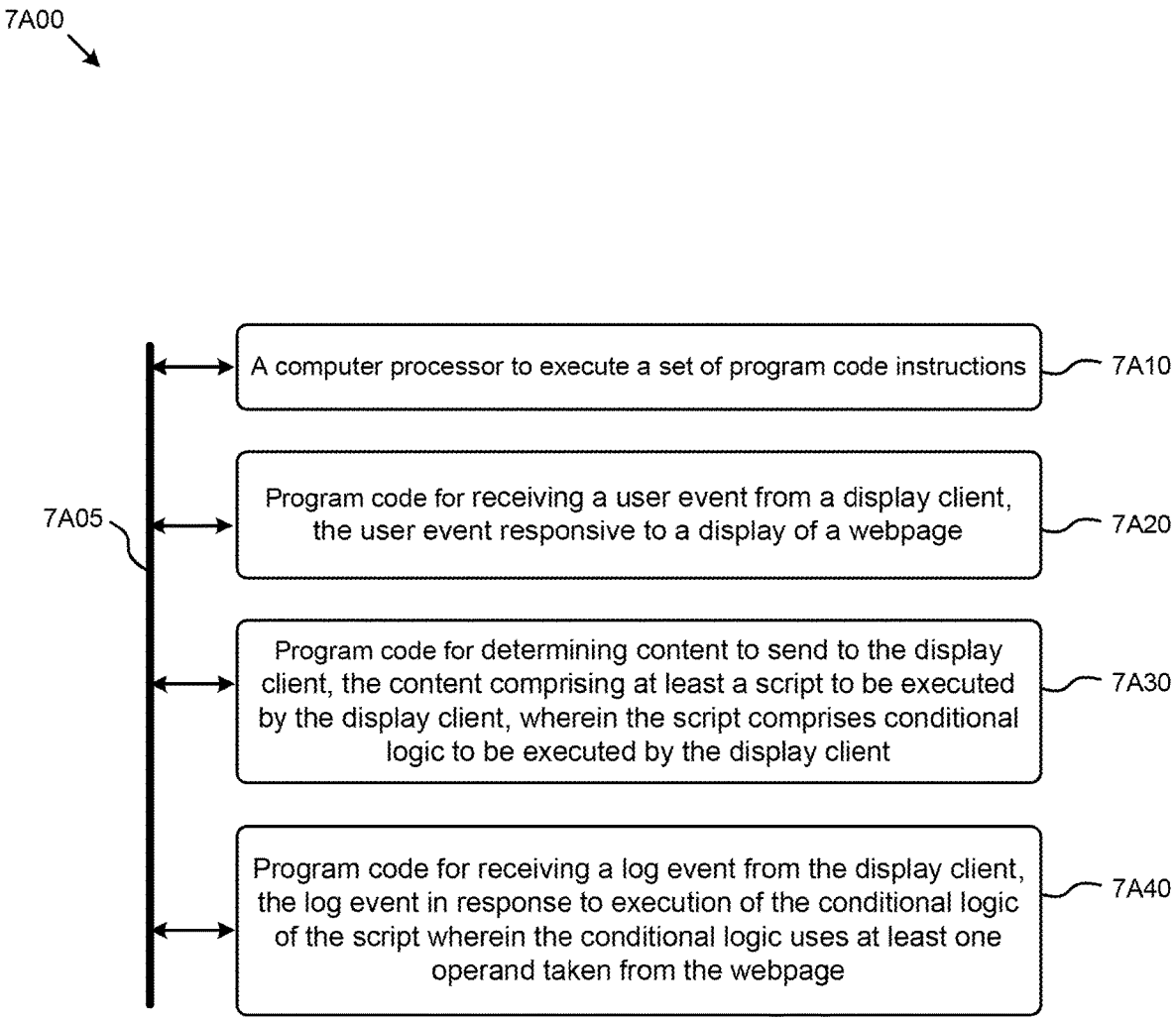
FIG. 7A, FIG. 7B, and FIG. 7C depict systems as an arrangements of computing modules that are interconnected so as to operate cooperatively to implement any of the herein-disclosed embodiments.

Additional Embodiments of the Disclosure
Additional Practical Application Examples FIG. 7A depicts a system as an arrangement of computing modules that are interconnected so as to operate cooperatively to implement any of the herein-disclosed embodiments. As an option, the present system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment 7A implements a portion of a computer system, shown as system 7A00, comprising a computer processor to execute a set of program code instructions (see module 7A10) and modules for accessing memory to hold program code instructions to perform: receiving at least one web page event responsive to an occurrence of an operation of a client device at the web page determining executable web page content to send to the client device, the executable web page content responsive to the operation, wherein the executable web page content comprises software instructions to be executed on the client device to generate execution results based on a condition present in the software instructions (see module 7A20); and receiving an event log message from the client device, the event log message content comprising at least a portion of the execution results (see module 7A30). The execution results based on a condition can include taking no action (e.g., depending on a corresponding evaluation of the condition), or can include sending a key-value pair and/or forming an event log message.

Figure 7B:
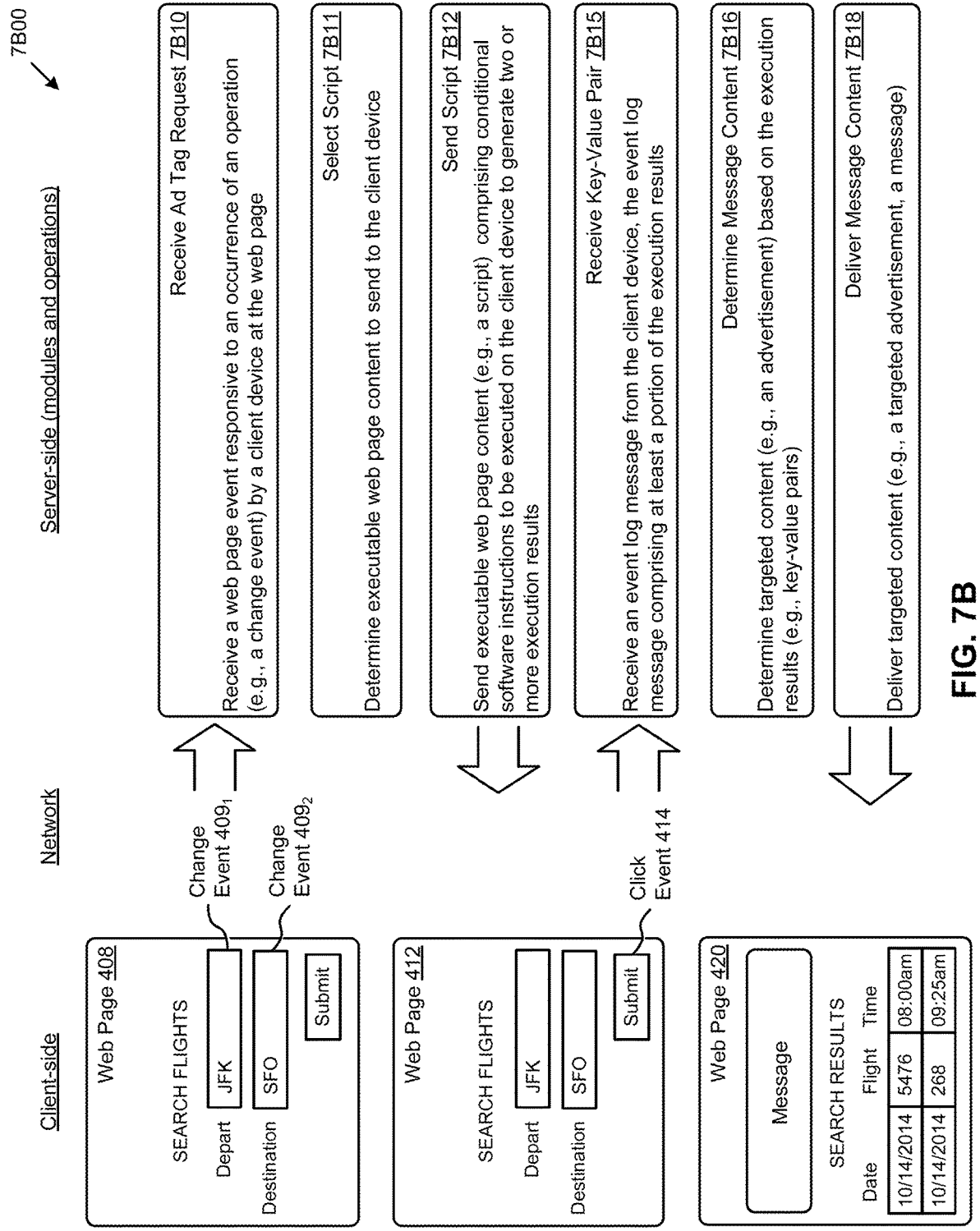

FIG. 7B depicts a system as an arrangement of computing modules that are interconnected so as to operate cooperatively to implement any of the herein-disclosed embodiments. The partitioning and sequencing 7B00 is merely illustrative and other partitions and sequences are possible. The shown sequence commences when a server-side module receives a web page event responsive to an occurrence of an operation (e.g., a change event) by a client device at the web page (see operation 7B10). Processing continues when the server determines and selects executable web page content to send to the client device (see operation 7B11), then sends the executable web page content (e.g., a script) comprising conditional software instructions to be executed on the client device to generate two or more execution results such as a log message, and/or such as a key and value in a key-value pair (see operation 7B12). The server waits to receive an event log message from the client device, the event log message comprising at least a portion of the execution results (see operation 7B15).

The server may communicate the execution results (e.g., key-value pairs) to other servers so as to co-operatively determine one or more ads or messages or other targeted content (e.g., a targeted advertisement, a message) to display to the user of the client-side device. The determined one or more ads or messages can be based on an expressed or inferred interest of the user, based at least in part on execution results (e.g., key-value pairs carrying properties of user interest). The server determines such targeted content (see operation 7B16), then delivers the targeted content to be displayed on the client-side device (see operation 7B18).

Figure 7C:
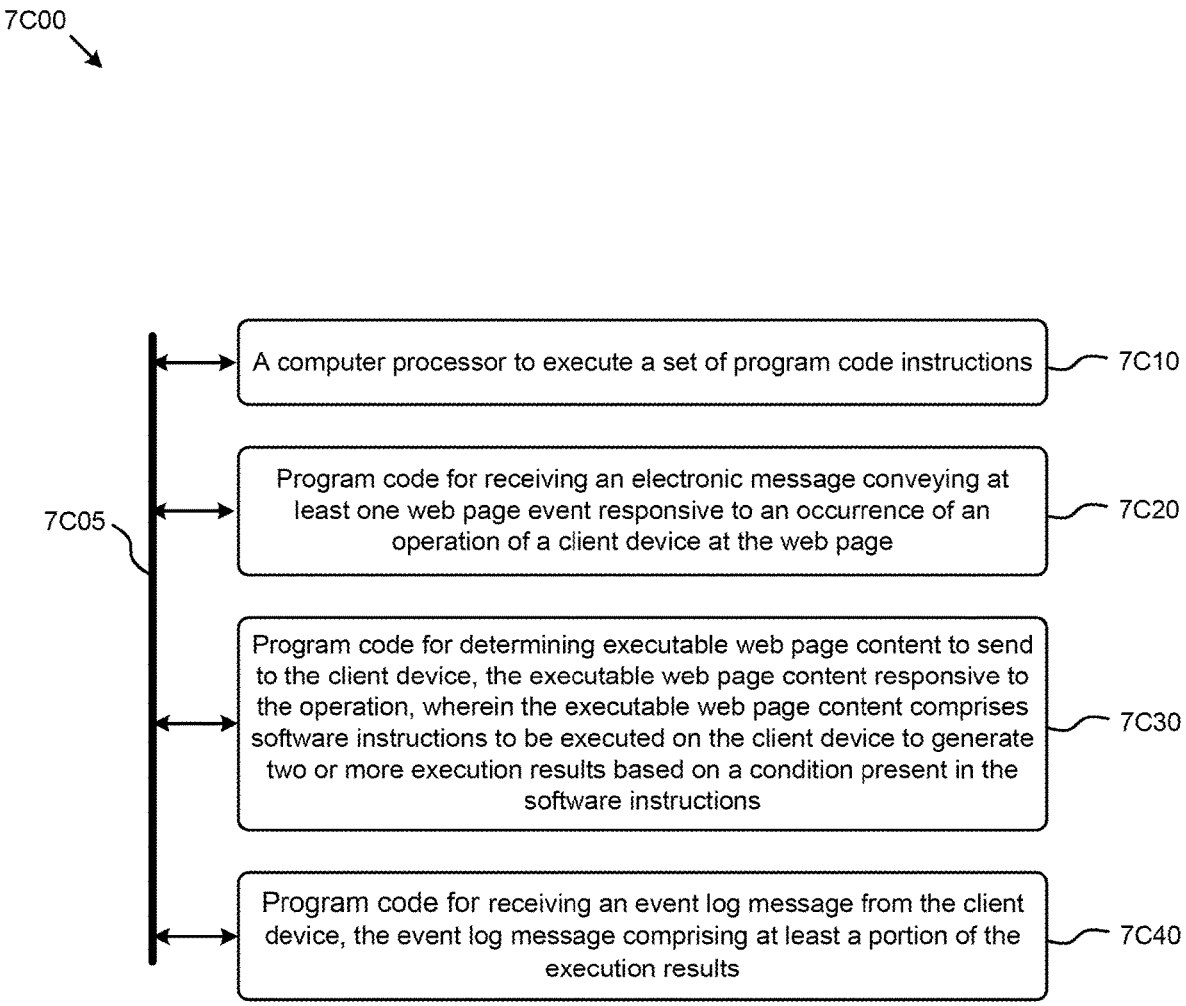

FIG. 7C depicts a system as an arrangement FIG. 7C depicts a system as an arrangement of computing modules that are interconnected so as to operate cooperatively to implement any of the herein-disclosed embodiments. As an option, the present system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with other operations over communication path 7C05. The modules of the system can, individually or in combination, perform method operations within system 7C00. Any operations performed within system 7C00 may be performed in any order unless as may be specified in the claims.

The shown embodiment implements a portion of a computer system, shown as system 7C00, comprising a computer processor to execute a set of program code instructions (see module 7C10) and modules for accessing memory to hold program code instructions to perform: receiving an electronic message conveying at least one web page event responsive to an occurrence of an operation of a client device at the web page (see module 7C20); determining executable web page content to send to the client device, the executable web page content responsive to the operation, wherein the executable web page content comprises software instructions to be executed on the client device to generate two or more execution results based on a condition present in the software instructions (see module 7C30); and receiving an event log message from the client device, the event log message comprising at least a portion of the execution results (see module 7C40). In some cases the two or more execution results comprises forming a log message containing a key-value pair, and in exemplary cases, the key-value pair comprises a key string selected from the web page, wherein the key-value pair comprises a value string selected from the web page.

System Architecture Overview
Additional System Architecture Examples

Figure 8A:
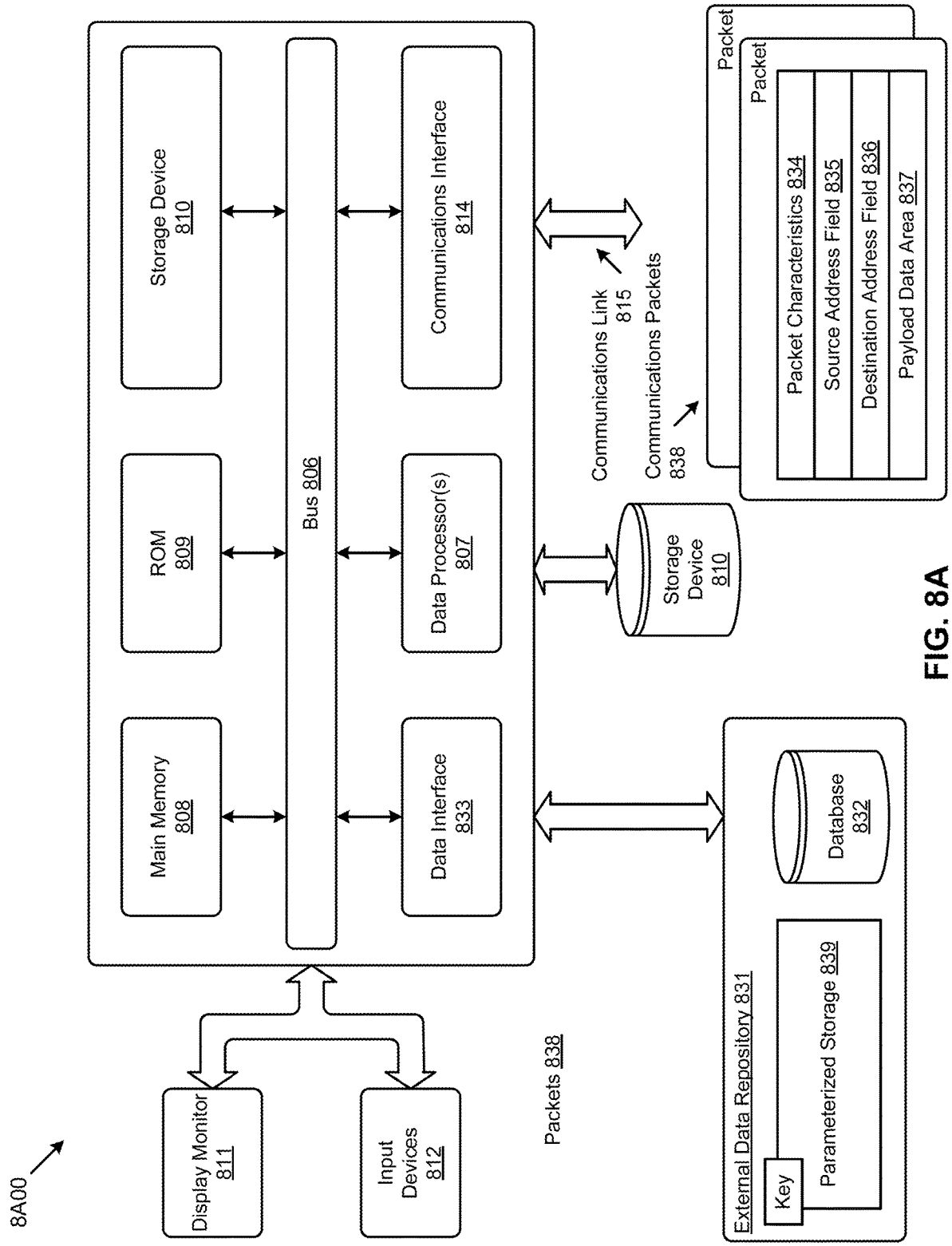
FIG. 8A, FIG. 8B, and FIG. 8C depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or port thereto can be configured differently from any other particular instance. Portions of a communication protocol can be carried out in whole or in part by any instance of the communication interface 814, and data (e.g., electronic messages, packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configured to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key). A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of evaluating page content to determine user interest.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of evaluating page content to determine user interest). Such files or records can be brought into and/or stored in volatile or non-volatile memory.

Figure 8B:
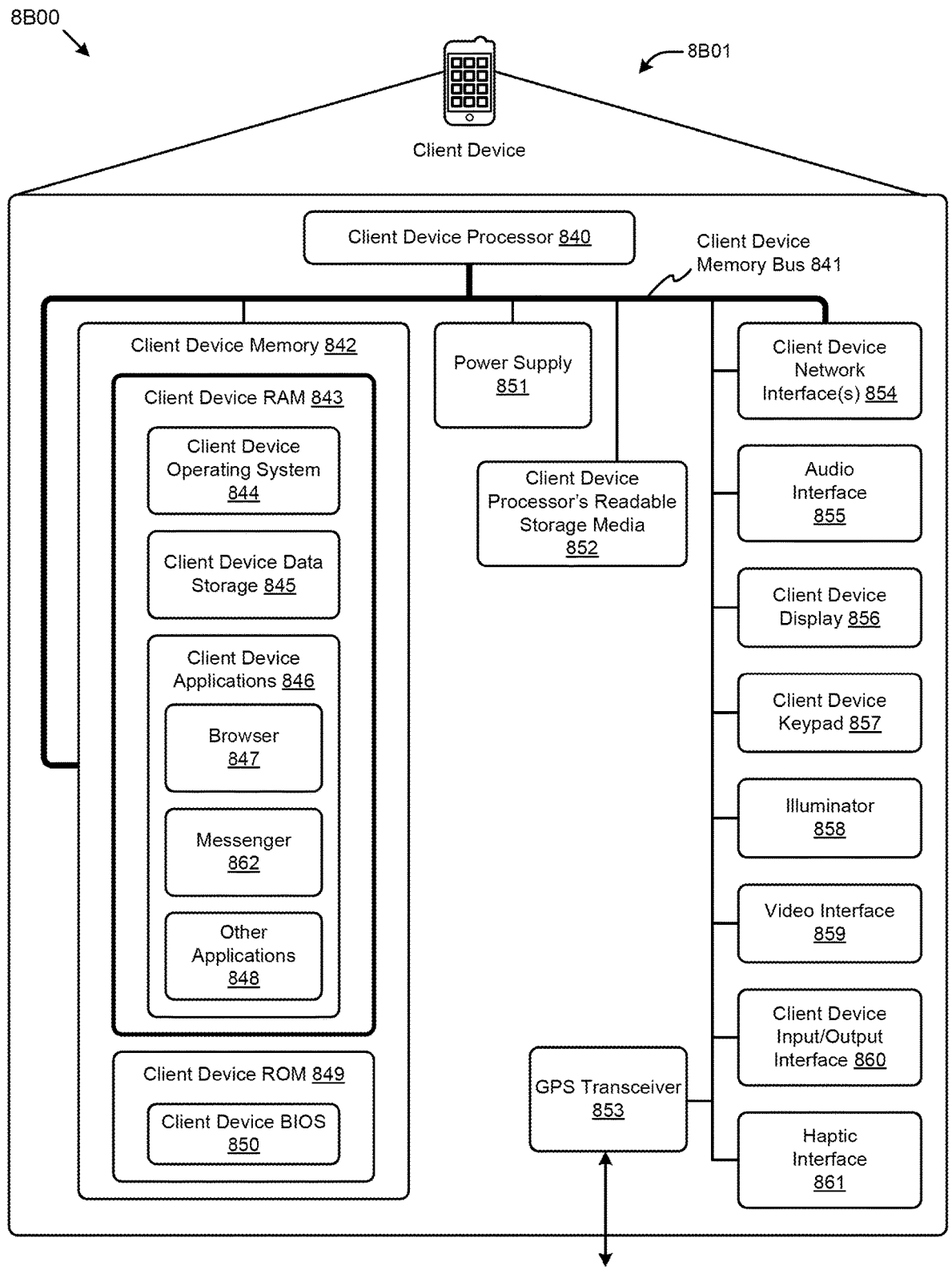

FIG. 8B depicts a block diagram 8B00 of an instance of a client device 8B01 that may be included in a system implementing instances of the herein-disclosed embodiments. Client device 8B01 may include many more or fewer components than those shown in FIG. 8B. Client device 8B01 may represent, for example, an embodiment of at least one of the client devices as heretofore disclosed.

As shown in the figure, client device 8B01 includes a client device processor 840 in communication with a client device memory 842 via a client device memory bus 841. Client device 8B01 also includes a power supply 851, one or more client device network interfaces 854, an audio interface 855, a client device display 856, a client device keypad 857, an illuminator 858, a video interface 859, a client device IO interface 860, a haptic interface 861, and a GPS transceiver 853 for global positioning services.

The power supply 851 provides power to client device 8B01. A rechargeable or non-rechargeable battery may be used to provide power. The power may also be provided by an external power source such as an AC adapter or a powered docking cradle that supplements and/or recharges a battery.

A client device 8B01 may optionally communicate with a base station, or directly with another computing device. A client device network interface 854 includes circuitry for coupling a client device 8B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 854 is sometimes known as a transceiver, a transceiving device, or a network interface card (NIC).

An audio interface 855 is arranged to produce and receive audio signals such as the sound of a human voice. For example, audio interface 855 may be coupled to a speaker and microphone to enable telecommunication with others and/or generate an audio acknowledgement for some action.

A client device display 856 may be a liquid crystal display (LCD), gas plasma, light emitting diode (LED), or any other type of display used with a computing device. A client device display 856 may also include a touch sensitive screen arranged to receive input from an object such as a stylus or a digit from a human hand.

A client device keypad 857 may comprise any input device arranged to receive input from a user. For example, client device keypad 857 may include a push button numeric dial, or a keyboard. A client device keypad 857 may also include command buttons that are associated with selecting and sending images.

An illuminator 858 may provide a status indication and/or provide light. Illuminator 858 may remain active for specific periods of time or in response to events. For example, when the illuminator 858 is active, it may backlight the buttons on client device keypad 857 and stay on while the client device is powered. Also, the illuminator 858 may backlight these buttons in various patterns when particular actions are performed such as dialing another client device. An illuminator 858 may also cause light sources positioned within a transparent or translucent case of the client device to illuminate in response to actions.

A video interface 859 is arranged to capture video images such as a still photo, a video segment, an infrared video or the like. For example, the video interface 859 may be coupled to a digital video camera, a web-camera or the like. A video interface 859 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 8B01 comprise a client device IO interface 860 for communicating with external devices such as a headset, or other input or output devices not shown in FIG. 8B. The client device IO interface 860 can use one or more communication technologies such as a USB, infrared, Bluetooth™ port or the like. A haptic interface 861 is arranged to as a human interface device (HID) to facilitate interaction with a user of a client device. Such interaction can include tactile feedback to a user of the client device. For example, the haptic interface 861 may be employed to cause vibration of the client device 8B01 in a particular way (e.g., with a pattern or periodicity) and/or when interacting with one or another user.

A GPS transceiver 853 can determine the physical coordinates of client device 8B01 on the surface of the Earth. The GPS transceiver 853, in some embodiments, may be optional. The shown GPS transceiver 853 outputs a location such as a latitude value and a longitude value. However, the GPS transceiver 853 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 8B01 on the surface of the Earth. It is understood that under different conditions, a GPS transceiver 853 can determine a physical location within millimeters for client device 8B01; and in other cases, the determined physical location may be less precise such as within a meter or significantly greater distances. In certain embodiments, the client device 8B01 may provide other information that may be employed to determine a physical location of the device including, for example, a media access control (MAC) address, IP address, IP port identifier, or the like.

The client device memory 842 includes random access memory 843, read-only memory 849, and other storage means. The client device memory 842 illustrates an example of computer readable storage media (devices) for storage of information such as computer readable instructions, data structures, program modules or other data. The client device memory 842 stores a basic IO system (BIOS) in the embodiment of client device BIOS 850 for controlling low-level operation of client device 8B01. The memory also stores an operating system 844 for controlling the operation of client device 8B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 842 further includes one or more instances of client device data storage 845, which can be used by client device 8B01 to store, among other things, client device applications 846 and/or other data. For example, client device data storage 845 may also be employed to store information that describes various capabilities of client device 8B01. The information may then be provided to another device based on any of a variety of events including being sent as part of a header during a communication, sent upon request or the like. Client device data storage 845 may also be employed to store social networking information including address books, buddy lists, aliases, user profile information or the like. Further, client device data storage 845 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 8B01, etc.

An instance of a client device processor's readable storage media 852 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 852 may also be referred to herein as computer readable storage media.

The client device applications 846 may include computer executable instructions which, when executed by client device 8B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 846 may include, for example, a messenger 862, a browser 847, and other applications 848. Certain instances of other applications 848 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 848 may collect and store user data that may be received from other computing devices in the environment.

A messenger 862 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 862 may be configured as an IM application such as AOL (America Online) instant messenger, Yahoo! messenger, .NET messenger server, ICQ or the like. In certain embodiments, the messenger 862 may be configured to include a mail user agent (MUA) such as Elm, Pine, message handling (MH), Outlook, Eudora, Mac Mail, Mozilla Thunderbird or the like. In another embodiment, the messenger 862 may be a client device application that is configured to integrate and employ a variety of messaging protocols including, but not limited, to various push and/or pull mechanisms for client device 8B01. In certain embodiments, the messenger 862 may interact with the browser 847 for managing messages. As used herein, the term "message" refers to any of a variety of messaging formats, or communications form including, but not limited to, email, SMS, IM, MMS, IRC or the like.

A browser 847 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 847 may enable a user of client device 8B01 to communicate with another network device as may be present in the environment.

Figure 8C:
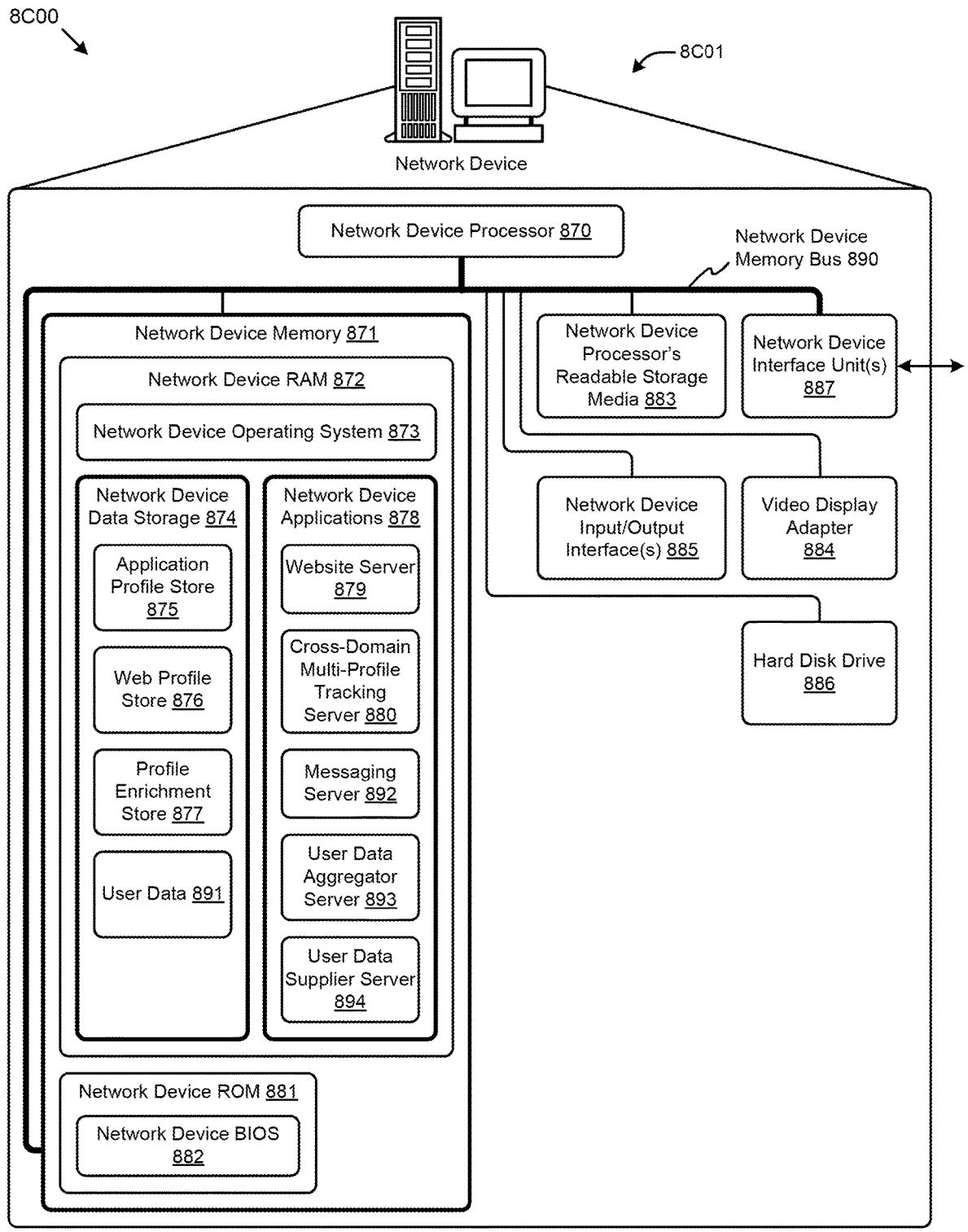

FIG. 8C depicts a block diagram 8C00 of an instance of a network device 8C01 that may be included in a system implementing instances of the herein-disclosed embodiments. Network device 8C01 may include many more or fewer components than those shown. Network device 8C01 may be configured to operate as a server, client, peer, a host, or any other device.

The network device 8C01 includes at least one instance of a network device processor 870, instances of readable storage media, network interface(s), a network device IO interface 885, a hard disk drive 886, a video display adapter 884, and a network device memory 871, all in communication with each other via a network device memory bus 890. The network device memory generally includes network device RAM 872, network device ROM 881. Some embodiments include one or more non-volatile mass storage devices such as a hard disk drive 886, a tape drive, an optical drive, and/or a floppy disk drive. The network device memory stores a network device operating system 873 for controlling the operation of network device 8C01. Any general-purpose operating system may be employed. A basic input/output system (BIOS) is also provided in the form of network device BIOS 882 for controlling the low-level operation of network device 8C01. As illustrated in FIG. 8C, a network device 8C01 also can communicate with the Internet, or some other communications network, via a network interface unit 887, which is constructed for use with various communication protocols including the TCP/IP protocol. The network interface unit 887 is sometimes known as a transceiver, a transceiving device, or a network interface card (NIC). Network device 8C01 also comprises a network device IO interface 885 for communicating with external devices such as a keyboard or other input or output devices. A network device IO interface 885 can use one or more communication technologies such as USB, infrared, Bluetooth™ or the like.

The storage devices as described above may use various types of computer readable media, namely non-volatile computer readable storage media and/or a client device processor's readable storage media and/or a network device processor's readable storage media 883. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 874 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 874 may further include program code, data, algorithms and the like, for use by a processor such as a network device processor 870 to execute and perform actions. In certain embodiments, at least some of the logical contents of network device data storage 874 might be stored on another component of network device 8C01, such as on a second instance of hard disk drive 886 or on an external/removable storage device.

The network device data storage 874 may further store any portions of application data and/or user data such as an application profile store 875, a web profile store 876, a profile enrichment store 877 and/or any user data collected. In some embodiments, user data 891 may store unique user data, non-unique user data, aggregated user data, and/or any combination thereof. User data 891 may include a variety of attributes such as a five digit zip code, an expanded nine digit zip code and the like.

The Network device data storage 874 may also store program code and data. One or more network device applications 878 may be loaded into network device data storage or any other mass memory, to be accessible to run with or as a part of network device operating system 873. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 892, website server 879, user data aggregator server 893, a cross-domain multi-profile tracking server 880, and/or user data supplier server 894 may also be included within or implemented as application programs.

A messaging server 892 may include virtually any computing component or components configured and arranged to forward messages from message user agents and/or other message servers, or to deliver messages to a local message store such as network device data storage 874 or the like. Thus, a messaging server 892 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 892 may also be managed by one or more components of the messaging server 892. Thus, the messaging server 892 may also be configured to manage SMS messages; IM, MMS, IRC, or RSS feeds; mIRC; or any of a variety of other message types. In certain embodiments, the messaging server 892 may enable users to initiate and/or otherwise conduct chat sessions, VOIP sessions or the like.

A website server 879 may represent any of a variety of information and services that are configured to provide content, including messages, over a network to another computing device. Thus, a website server 879 can include, for example, a web server, a file transfer protocol (FTP) server, a database server, a content server or the like. A website server 879 may provide the content including messages over the network using any of a variety of formats including, but not limited to WAP, HDML, WML, SGML, HTML, XML, compact HTML (cHTML), extensible HTML (xHTML) or the like. A website server 879 may also be configured to enable a user of a client device to browse websites, upload user data, view and interact with advertisements or the like.

A user data aggregator server 893 is configured to aggregate user data to be provided to user data buyers for advertising campaigns. In certain embodiments, a user data aggregator server 893 may be configured to receive collected user data from a user data supplier server 894. In some embodiments, a user data aggregator server 893 may receive a query for user data. Based on the query, a user data aggregator server 893 may generate a plurality of subsets of aggregated user data. In some embodiments, user data aggregator server 893 may be included in a network device.

A user data supplier server 894 is configured to collect user data. In certain embodiments, the user data supplier server 894 may be configured to provide the collected user data to user data aggregator server 893. In some embodiments, the user data supplier server 894 may collect and/or provide unique user data and/or non-unique user data. In certain embodiments, the user data supplier server 894 may aggregate the collected user data. In some embodiments, the user data supplier server 894 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or between other networks.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    receiving, from a client device, an electronic message indicating an occurrence of at least one webpage event at the client device, the at least one webpage event having been triggered by user input received by a webpage;
    identifying, in response to receiving the electronic message, a set of user attributes from the electronic message, the set of user attributes including at least a portion of the user input received by the webpage;
    determining that the set of user attributes matches a particular record stored in a taxonomy of records;
    determining, based on the particular record, one or more scripts and conditional content;
    generating, a new webpage that includes the one or more scripts and the conditional content, the one or more scripts configured to execute when the webpage is loaded to:
        monitor user browsing activity with respect to the webpage;
        detect, using the user browsing activity, that a condition has been satisfied;
        render, in response to detecting that the condition has been satisfied, the conditional content within the new webpage; and
        transmit a request for an additional script configured for execution within the new webpage;
    transmitting the new webpage to the client device, wherein the new webpage is configured to be loaded upon being received by the client device;
    receiving, from the client device, the request for the additional script, the request having been generated in response to the one or more scripts detecting that the condition has been satisfied based on user browsing activity; and
    transmitting, to the client device and in response to receiving the request for the additional script, the additional script and new conditional content, the additional script being configured to detect an occurrence of a new condition and render the new conditional content within the new webpage in response to detecting the occurrence of the new condition.

2. The method of claim 1, wherein different content from the conditional content is rendered within the new webpage in response to detecting that the condition has not been satisfied.

3. The method of claim 1, further comprising receiving an event log message from the client device indicating that the at least one of the one or more scripts has been executed by the client device.

4. The method of claim 1, wherein at least one of the one or more scripts forms a key-value pair derived from the webpage.

5. The method of claim 1, wherein at least one of the one or more scripts generates a log message containing a key-value pair.

6. The method of claim 1, wherein the conditional content includes at least one of, a banner ad, or a targeted advertisement, or a beacon, or any combination thereof.

7. The method of claim 1, wherein at least one of the one or more scripts includes at least two conditions, each condition having at least one operand and at least one operator, wherein a first one of the two conditions causes a first content to be rendered and a second one of the two conditions causes an content different from the first content to be rendered.

8. The method of claim 7, wherein the operand or the operator is determined by execution of at least a portion of a particular script of the one or more scripts that generates dynamically-determined page hints.

9. The method of claim 7, wherein the operand is determined from an element of the webpage.

10. The method of claim 1, further comprising determining a new taxonomy category based at least in part an event log message.

11. A computer program product, embodied in a non-transitory computer readable medium, the non-transitory computer readable medium having stored thereon a sequence of instructions which, when stored in memory and executed by a processor causes the processor to perform a set of operations, the operations comprising:
    receiving an electronic message indicating an occurrence of at least one webpage event at a client device, the at least one webpage event having been triggered by user input received by a webpage;
    identifying, in response to receiving the electronic message, a set of user attributes from the electronic message, the set of user attributes including at least a portion of the user input received by the webpage;
    determining that the set of user attributes matches a particular record stored in a taxonomy of records;
    determining, based on the particular record, one or more scripts and conditional content;
    generating a new webpage that includes the one or more scripts and the conditional content, the one or more scripts configured to execute when the webpage is loaded to:
        monitor user browsing activity with respect to the webpage;

detect, using the user browsing activity, that a condition has been satisfied;
render, in response to detecting that the condition has been satisfied, the conditional content within the new webpage; and
transmit a request for an additional script configured for execution within the new webpage;
transmitting the new webpage to the client device, wherein the new webpage is configured to be loaded upon being received by the client device
receiving, from the client device, the request for the additional script, the request having been generated in response to the one or more scripts detecting that the condition has been satisfied based on user browsing activity; and
transmitting, to the client device and in response to receiving the request for the additional script, the additional script and new conditional content, the additional script being configured to detect an occurrence of a new condition and render the new conditional content within the new webpage in response to detecting the occurrence of the new condition.

12. The computer program product of claim 11, wherein different content from the conditional content is rendered within the new webpage in response to detecting that the condition has not been satisfied.

13. The computer program product of claim 11, further comprising instructions which, when stored in memory and executed by a processor causes the processor to perform receiving an event log message from the client device indicating that the at least one of the one or more scripts has been executed by the client device.

14. The computer program product of claim 11, wherein at least one of the one or more scripts forms a key-value pair derived from the webpage.

15. The computer program product of claim 11, wherein at least one of the one or more scripts includes at least two conditions, each condition having at least one operand and at least one operator, wherein a first one of the two conditions causes a first content to be rendered and a second one of the two conditions causes content different from the first content to be rendered.

16. The computer program product of claim 15, wherein the operand or the operator is determined by execution of at least a portion of a particular script of the one or more scripts that generates dynamically-determined page hints.

17. The computer program product of claim 11, wherein the conditional content includes at least one of, a banner ad, or a targeted advertisement, or a beacon, or any combination thereof.

18. The computer program product of claim 11, wherein the operations further comprise determining a new taxonomy category based at least in part an event log message.

19. A system comprising:
a server comprising:
one or more processors;
a non-transitory computer-readable medium including instructions that when executed by the one or more processors, cause the one or more processors to perform operations including:
receiving an electronic message indicating an occurrence of at least one webpage event at a client device, the at least one webpage event having been triggered by user input received by a webpage;
identifying, in response to receiving the electronic message, a set of user attributes from the electronic message, the set of user attributes including at least a portion of the user input received by the webpage;
determining that the set of user attributes matches a particular record stored in a taxonomy of records;
determining, based on the particular record, one or more scripts and conditional content;
generating a new webpage that includes the one or more scripts and the conditional content, the one or more scripts configured to execute when the webpage is loaded to:
monitor user browsing activity with respect to the webpage;
detect, using the user browsing activity, that a condition has been satisfied;
render, in response to detecting that the condition has been satisfied, the conditional content within the new webpage; and
transmit a request for an additional script configured for execution within the new webpage;
transmitting the new webpage to the client device, wherein the new webpage is configured to be loaded upon being received by the client device
receiving, by the server and from the client device, the request for the additional script, the request having been generated in response to the one or more scripts detecting that the condition has been satisfied based on user browsing activity; and
transmitting, to the client device and in response to receiving the request for the additional script, the additional script and new conditional content, the additional script being configured to detect an occurrence of a new condition and render the new conditional content within the new webpage in response to detecting the occurrence of the new condition.

20. The system of claim 19, wherein at least one of the one or more scripts forms a key-value pair derived from the webpage.

* * * * *